(12) United States Patent
Machida et al.

(10) Patent No.: US 11,780,072 B2
(45) Date of Patent: Oct. 10, 2023

(54) DUST COLLECTOR FOR ELECTRIC POWER TOOL AND ELECTRIC POWER TOOL

(71) Applicant: MAKITA CORPORATION, Anjo (JP)

(72) Inventors: Yoshitaka Machida, Anjo (JP); Masanori Furusawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 452 days.

(21) Appl. No.: 16/770,492

(22) PCT Filed: Dec. 12, 2018

(86) PCT No.: PCT/JP2018/045608
§ 371 (c)(1),
(2) Date: Jun. 5, 2020

(87) PCT Pub. No.: WO2019/124179
PCT Pub. Date: Jun. 27, 2019

(65) Prior Publication Data
US 2021/0178568 A1    Jun. 17, 2021

(30) Foreign Application Priority Data
Dec. 21, 2017    (JP) ................................ 2017-245347

(51) Int. Cl.
*B25F 5/02* (2006.01)
*B23Q 11/00* (2006.01)
*B25D 17/20* (2006.01)

(52) U.S. Cl.
CPC ............ *B25F 5/02* (2013.01); *B23Q 11/0071* (2013.01); *B23Q 11/0046* (2013.01); *B25D 17/20* (2013.01)

(58) Field of Classification Search
None
See application file for complete search history.

(56) References Cited

U.S. PATENT DOCUMENTS 4,787,923 A  *  11/1988  Fleigle ...................... A47L 9/20
55/497
5,467,835 A  *  11/1995  Obermeier ......... B23Q 11/0046
173/75

(Continued)

FOREIGN PATENT DOCUMENTS

CN          2887416 Y       4/2007
CN        201734661 U       2/2011
(Continued)

OTHER PUBLICATIONS

Jun. 8, 2021 Office Action issued in Chinese Patent Application No. 201880081844.X.
(Continued)

*Primary Examiner* — Tanzim Imam
(74) *Attorney, Agent, or Firm* — Oliff PLC

(57) ABSTRACT

In a dust collector for electric power tool, while a casing includes a tubular suction opening portion disposed to protrude forward, a dust collecting route is formed in the casing to ensure capturing a dust suctioned with an air by a filter disposed in a dust box. The suction opening portion is abutted on a surface to be processed and a tool bit of a hammer drill is passable through the suction opening portion. The dust collecting route suctions the air from the suction opening portion and guides the air into the dust box disposed to the casing. The dust box includes a dust removal device (rubber) configured to directly act to the filter from outside to remove the dust accumulated on the filter.

9 Claims, 14 Drawing Sheets

(56) References Cited

U.S. PATENT DOCUMENTS

| | | | |
|---|---|---|---|
| 7,550,021 B2 * | 6/2009 | Witter | B01D 46/76 55/467 |
| 2006/0107633 A1 * | 5/2006 | Walker | B23Q 11/0046 55/385.1 |
| 2008/0202781 A1 * | 8/2008 | Nishikawa | B23Q 11/0071 408/124 |
| 2012/0273243 A1 * | 11/2012 | Tada | B23Q 11/0046 173/198 |
| 2012/0298391 A1 * | 11/2012 | Kakiuchi | B23Q 11/0046 173/217 |
| 2013/0183111 A1 * | 7/2013 | Lerch | B23B 47/34 408/56 |
| 2016/0114448 A1 * | 4/2016 | Appel | A47L 5/22 15/339 |
| 2017/0266599 A1 * | 9/2017 | Lin | B01D 46/521 |
| 2018/0280857 A1 | 10/2018 | Ullrich | |

FOREIGN PATENT DOCUMENTS

| | | | | |
|---|---|---|---|---|
| CN | 102251795 | A | 11/2011 | |
| CN | 102553361 | A | 7/2012 | |
| CN | 203916316 | U | 11/2014 | |
| CN | 206535333 | U | 10/2017 | |
| DE | 10143941 | A1 | 3/2003 | |
| DE | 102015217825 | A1 | 3/2017 | |
| EP | 0388385 | A1 * | 9/1990 | ........... B01D 46/106 |
| EP | 0388385 | A1 * | 9/1990 | ........... B01D 46/106 |
| EP | 2011992 | A2 * | 1/2009 | ......... B01D 46/0075 |
| JP | S36-028772 | Y1 | 11/1961 | |
| JP | S48-010073 | U | 2/1973 | |
| JP | S53-031264 | A | 3/1978 | |
| JP | S58-023616 | U | 2/1983 | |
| JP | S64-038121 | A | 2/1989 | |
| JP | H09-000843 | A | 1/1997 | |
| JP | 2003-230516 | A | 8/2003 | |
| JP | 2003-245513 | A | 9/2003 | |
| JP | 5739268 | B2 | 6/2015 | |
| JP | 2017-144507 | A | 8/2017 | |
| WO | 2017/045857 | A1 | 3/2017 | |

OTHER PUBLICATIONS

Jan. 18, 2022 Office Action issued in Chinese Patent Application No. 201880081844.X.

Feb. 26, 2019 International Search Report issued in International Patent Application No. PCT/JP2018/045608.

Jun. 23, 2020 International Preliminary Report on Patentability issued in International Patent Application No. PCT/JP2018/045608.

Nov. 30, 2021 Office Action issued in Japanese Patent Application No. 2017-245347.

* cited by examiner

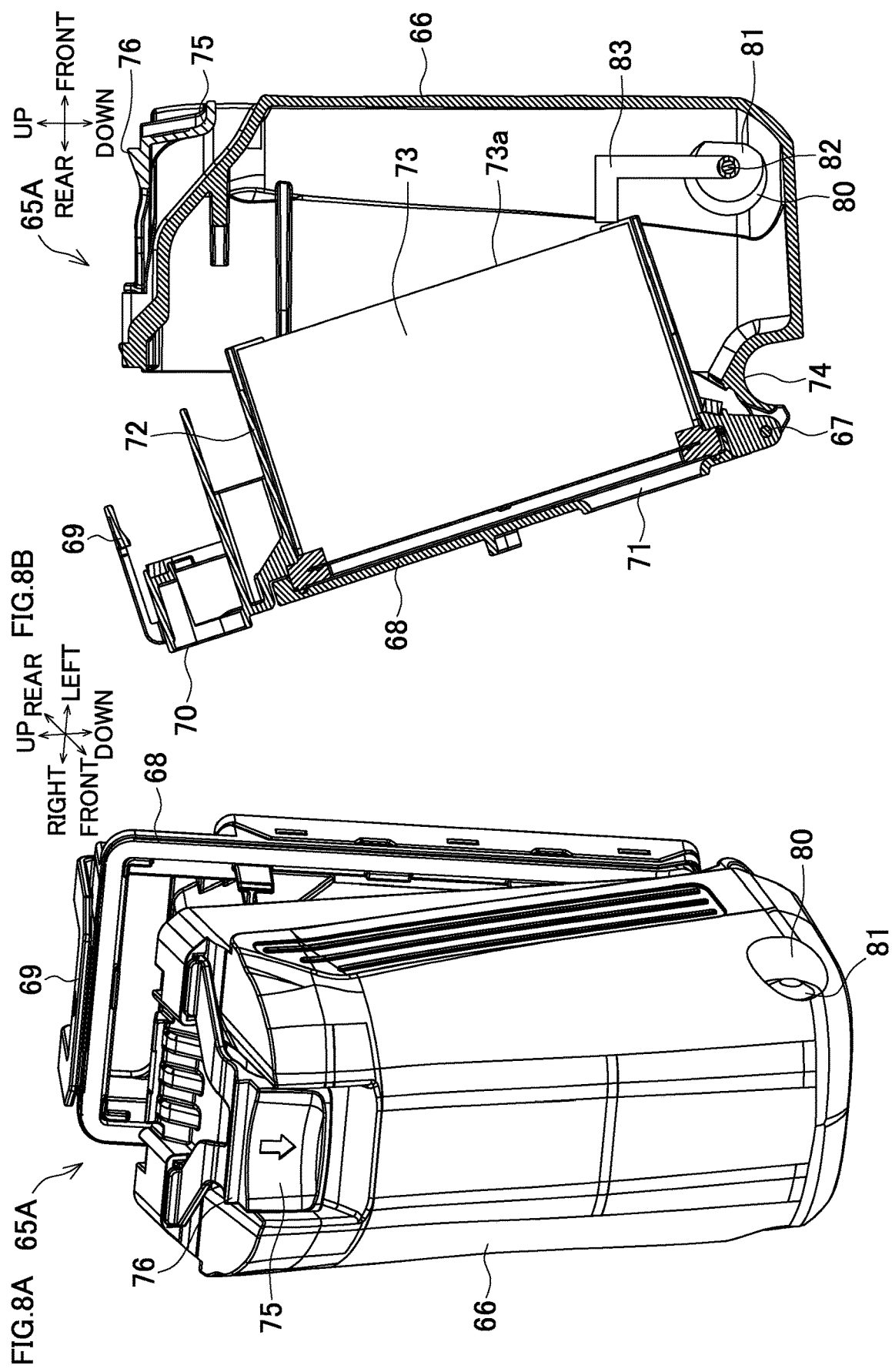

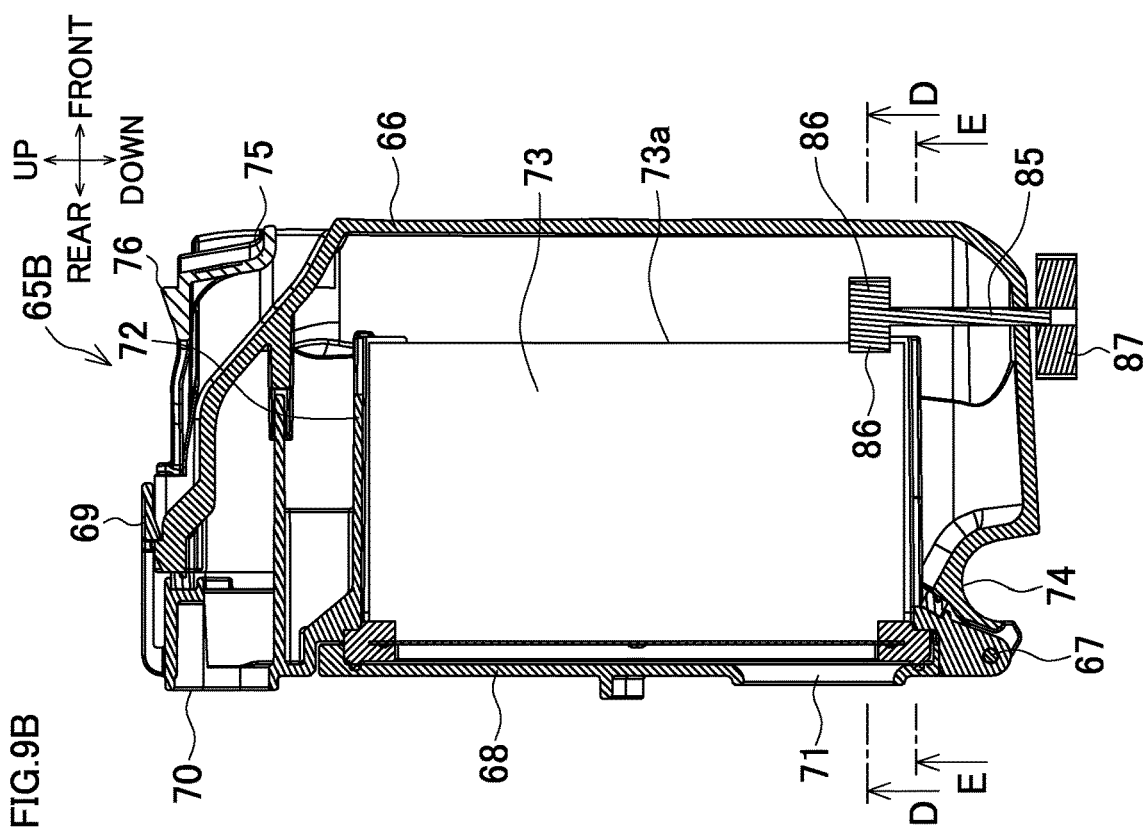
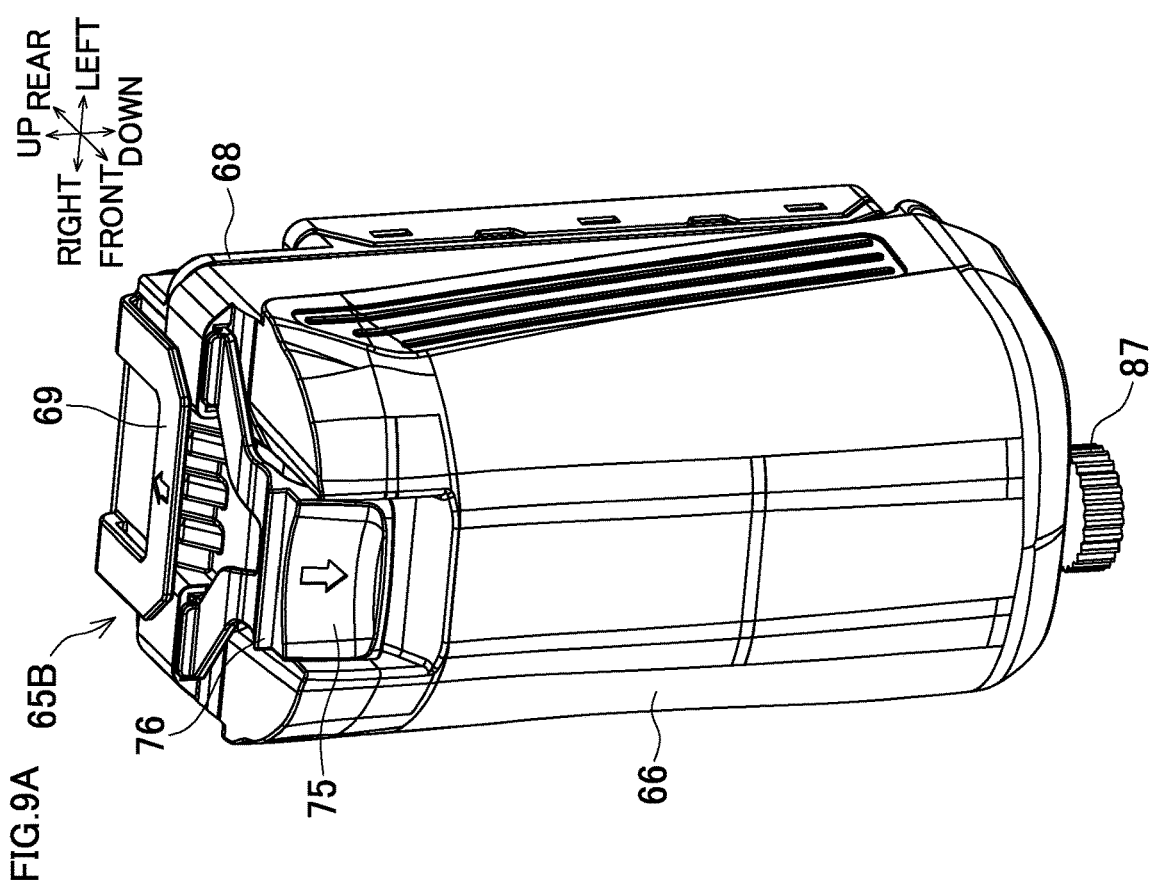

DUST COLLECTOR FOR ELECTRIC POWER TOOL AND ELECTRIC POWER TOOL

BACKGROUND OF THE INVENTION

This application claims the benefits of International Application No. PCT/JP2018/045608, filed on Dec. 12, 2018 and Japanese Patent Application Number No. 2017-245347 filed on Dec. 21, 2017, the entirety of which is incorporated by reference.

TECHNICAL FIELD

The invention relates to a dust collector for electric power tool mounted to an electric power tool, such as an electric drill and a hammer drill, and an electric power tool to which the dust collector is mounted.

BACKGROUND ART

To an electric power tool, such as an electric drill and a hammer drill, a dust collector, which collects dust generated from a workpiece in a drilling work and the like, is mounted. Specifically, it is a structure where, by suctioning an air that contains the dust into a body case of the dust collector to cause the air to pass through a filter in a dust box, the dust is captured by the filter and accumulated in the dust box.

In the dust collector for electric power tool, when the amount of the dust accumulated on the filter increases with the progress of the work and clogging occurs on the filter, a dust collection efficiency and a product lifetime of the filter decrease. Therefore, Japanese Patent No. 5739268 discloses an invention where a pump in an accordion shape configured to send air by compression from a downstream side toward an upstream side of a filter is disposed in a body case, and the pump is operated to flow the air backward, thereby blowing away dust accumulated on the filter.

DISCLOSURE OF THE INVENTION

In the conventional dust collector, since the air is flown backward on a dust collecting route from a suction opening portion on a tool bit side to the filter, the dust is possibly accumulated in the middle of the dust collecting route, or the dust is possibly blown out from the suction opening portion by the air flowing backward. Accordingly, the dust collecting route needs to be processed so as to avoid moving of the dust to the suction opening portion side, thus leading to cost increase.

Therefore, it is an object of the invention to provide a dust collector for electric power tool configured to easily avoid filter clogging at low cost, and an electric power tool.

In order to achieve the above-described object, a first aspect of the invention is a dust collector for electric power tool that includes a casing, a tubular suction opening portion, a dust collecting route, a filter, and a dust removal means. The casing is mountable to an electric power tool. The suction opening portion is disposed to protrude forward from the casing. A tool bit of the electric power tool is passable through the suction opening portion being abutted on a surface to be processed. The dust collecting route is formed in the casing. The dust collecting route suctions an air from the suction opening portion and guides the air into a dust box disposed to the casing. The filter is disposed in the dust box and configured to capture a dust suctioned with the air. The dust removal means is configured to directly act to the filter from outside the dust box to remove the dust accumulated on the filter.

In the case, the dust removal means is preferably an elastic member that forms a part of the dust box and has an inner surface abutted on the filter by at least an elastic deformation.

The filter is preferably folded in a right-left direction, the elastic member forms the part including right and left side surfaces of the dust box, and the inner surface abuts on right and left side surfaces of the filter.

The dust box is preferably made of a resin, and the elastic member is preferably a rubber bonded to the dust box.

The rubber preferably has right and left side surfaces where recesses are formed to be inwardly depressed with respect to the resin part of the dust box to abut on the side surfaces of the filter.

The dust removal means is preferably disposed to be close to or abutted on the filter in the dust box, and the dust removal means is preferably a dust removal member operatable from outside the dust box.

The filter is preferably folded in a right-left direction, and the dust removal member is preferably movable by the operation from outside in an intersecting direction with a mountain folded portion of the filter.

The dust removal member is preferably inserted between a plurality of the mountain folded portions.

The dust box preferably has right and left side surfaces where operation holes are penetratingly formed, rubbers are preferably bonded in the respective operation holes, and the dust removal member is preferably secured to a support shaft bridged between the rubbers.

The dust removal member is preferably rotated by the operation from outside.

A dust collection motor is preferably included and the filter is preferably elastically supported, and the dust removal means preferably includes a dust removal member operated by driving of the dust collection motor and an operation member configured to press the filter to the dust removal member side from outside the dust box.

The dust removal member is preferably disposed between the dust collection motor and the filter, and the dust removal member is preferably a cam rotated by rotation of an output shaft of the dust collection motor.

In order to achieve the above-described object, a second aspect of the invention is an electric power tool that includes the dust collector for electric power tool according to the first aspect mounted thereto.

According to the invention, by disposing the dust removal means configured to directly act to the filter from outside the dust box to remove the dust accumulated on the filter, the expansion and contraction, the vibration, and the like of the filter can be directly performed with the dust removal means, thus ensuring the effective dust removal at ease. Accordingly, filter clogging can be easily avoided at low cost.

Especially, when the dust removal means is an elastic member that forms a part of the dust box and has an inner surface abutting on the filter, the vibration and the like can be easily applied to the filter from outside using the part of the dust box. The dust removal means does not project outside the dust box and does not become a hindrance.

Especially, when the filter is folded in the right-left direction, the elastic member forms a part of the dust box including the right and left side surfaces, and the inner surface of the elastic member abuts on the right and left side surfaces of the filter, the filter can be easily expanded and contracted or vibrated by the operation of the elastic member from outside.

Especially, when the dust removal means is disposed to be close to or abutted on the filter in the dust box, and the dust removal means is a dust removal member operatable from outside the dust box, the vibration and the like can be surely and easily applied to the filter. The dust removal member is not exposed outside the dust box and does not become a hindrance.

Especially, when the filter is folded in a right-left direction, and the dust removal member is movable by the operation from outside in an intersecting direction with a mountain folded portion of the filter, the filter folded in the right-left direction can be efficiently swung.

Especially, when the dust removal member is inserted between the mountain folded portions of the filter, the dust removal member can be surely abutted on the mountain folded portion to be swung.

Especially, when the dust removal member is rotated by the operation from outside, the dust removal of the filter can be performed by a simple rotating operation.

Especially, when the dust removal means has a configuration that includes a dust removal member operated by driving of the dust collection motor and an operation member configured to press the filter to the dust removal member side from outside the dust box, the effective vibration can be applied to the filter using the dust collection motor.

Especially, when the dust removal member is disposed between the dust collection motor and the filter, and the dust removal member is a cam rotated by rotation of an output shaft of the dust collection motor, the rotation of the output shaft can be efficiently transmitted to the filter as the vibration.

BRIEF DESCRIPTION OF THE DRAWINGS

FIG. 8A is a perspective view illustrating the dust box in the embodiment 2 in an opened state.

FIG. 8B is a center vertical cross-sectional view illustrating the dust box in the embodiment in the opened state.

FIG. 9A is a perspective view of a dust box in an embodiment 3.

FIG. 9B is a center vertical cross-sectional view of the dust box in the embodiment 3.

FIG. 10B is a cross-sectional view taken along the line E-E of FIG. 9B.

EMBODIMENTS

The following describes embodiments of the invention based on the drawings.

An embodiment 1 of the invention will be described below.

Figure 1:
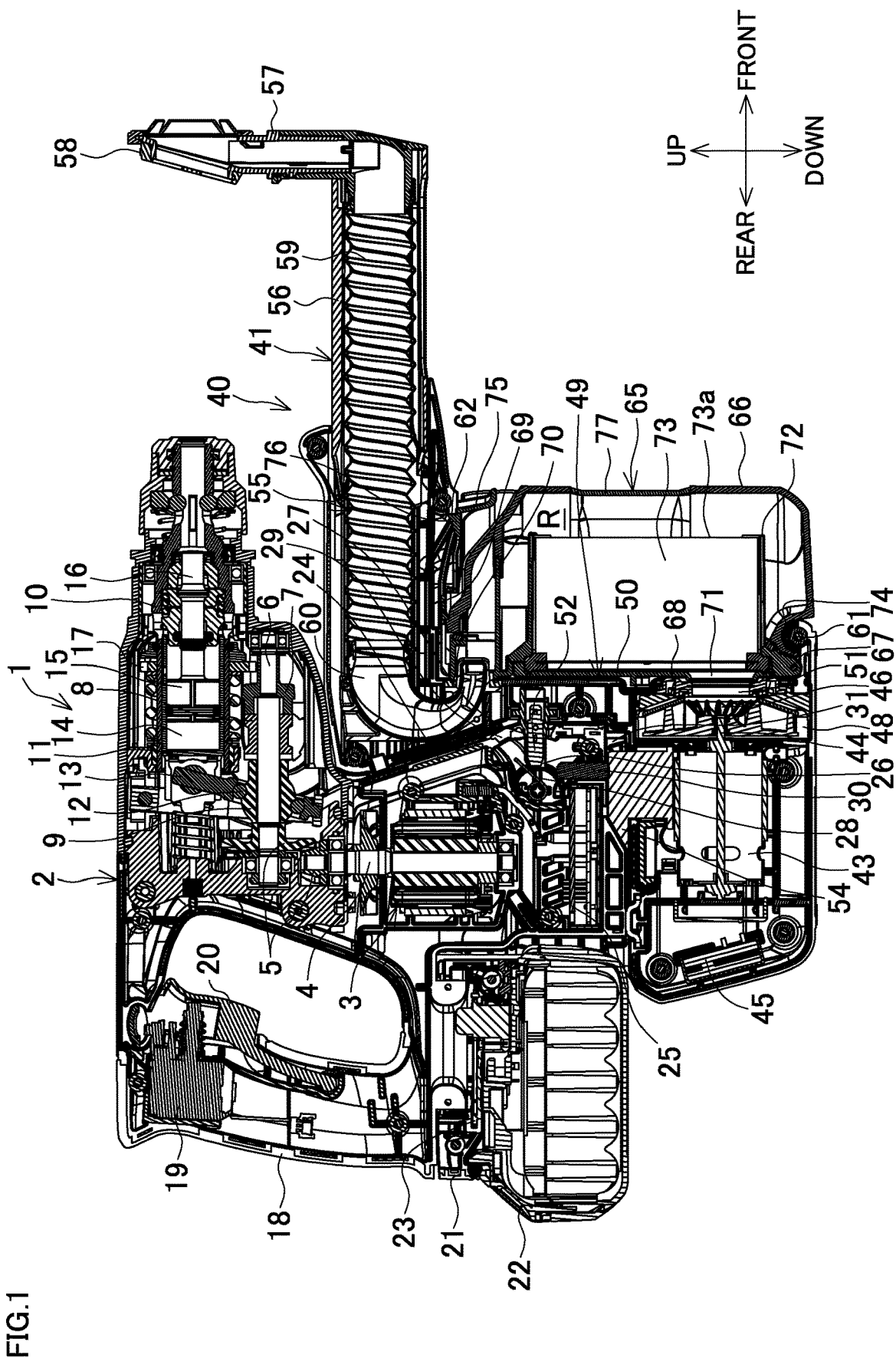
FIG. 1 is a center vertical cross-sectional view of a hammer drill to which a dust collector for electric power tool in an embodiment 1 is mounted.

FIG. 1 illustrates a center vertical cross-section in a state where a dust collector for electric power tool (hereinafter simply referred to as a "dust collector") 40 is mounted to a hammer drill 1 as an exemplary electric power tool.

First, the hammer drill 1 houses a motor (brushless motor) 3 having an output shaft 4 facing upward in a front lower portion of a housing 2 formed by assembling a pair of right and left half housings. On the upper side of the motor 3, an intermediate shaft 6, to which a torque is transmitted via bevel gears 5, 5, is supported in a front-rear direction, and the intermediate shaft 6 includes a first gear 7, a clutch 8, and a boss sleeve 9 from the front side. On the upper side of the intermediate shaft 6, a tool holder 10, which has a tip where a bit (not illustrated) as a tool bit is mountable, is pivotally supported parallel to the intermediate shaft 6. An arm 13 is coupled to a rear end of a piston cylinder 11 movably inserted into a rear portion of the tool holder 10, and the arm 13 is externally mounted to the boss sleeve 9 via a swash bearing 12. Inside the piston cylinder 11, a striker 15 is mounted to be movable back and forth via an air chamber 14, and the striker 15 is configured to hammer an impact bolt 16 disposed ahead of the striker 15. The first gear 7 is engaged with a second gear 17 mounted to the tool holder 10.

At a rear upper portion of the housing 2, a handlebar 18 that includes a switch 19 and a switch lever 20 is formed. Downward the handlebar 18, a battery mounting portion 21, to which a battery pack 22 as a power source is slidingly mounted from the rear side, is disposed. Inside the battery mounting portion 21, a terminal block 23 electrically coupled to the mounted battery pack 22 is disposed.

The front lower portion of the housing 2 has a front surface inclined forward and downward, and projects to the front of the battery pack 22, thus forming a mounting portion 24 to which the dust collector 40 is mounted. The mounting portion 24 internally houses the motor 3, and a controller 25 is housed in the front-rear direction below the mounting portion 24. The controller 25 is electrically coupled to the motor 3, the switch 19, and the terminal block 23, and includes a circuit substrate that includes a microcomputer, a switching element, and the like.

On the front upper side of the controller 25, a connector 26 is disposed, in which three female terminals for power source and communication are arranged side by side in a right-left direction. An insertion port 27 is provided to be open ahead of the connector 26 on a front surface of the mounting portion 24. The connector 26 is supported swingably in the up-down direction around the rear end, and biased by a torsion spring 28 to a lower limit position to close the insertion port 27 with a shutter portion 29 disposed on an upper portion. Below the connector 26, a press bar 30 is disposed movable up and down, and the press bar 30 projects to a lower surface of the mounting portion 24 at the lower limit position of the connector 26. In the center in the right-left direction on the lower surface of the mounting portion 24, a lower depressed portion 31, to which the press bar 30 projects, is formed while the front side and the lower surface are open. On both side surfaces of the mounting portion 24 corresponding to right and left of the lower depressed portion 31, guide grooves (not illustrated) for slidingly mounting the dust collector 40 are formed in the front-rear direction.

Figure 2:
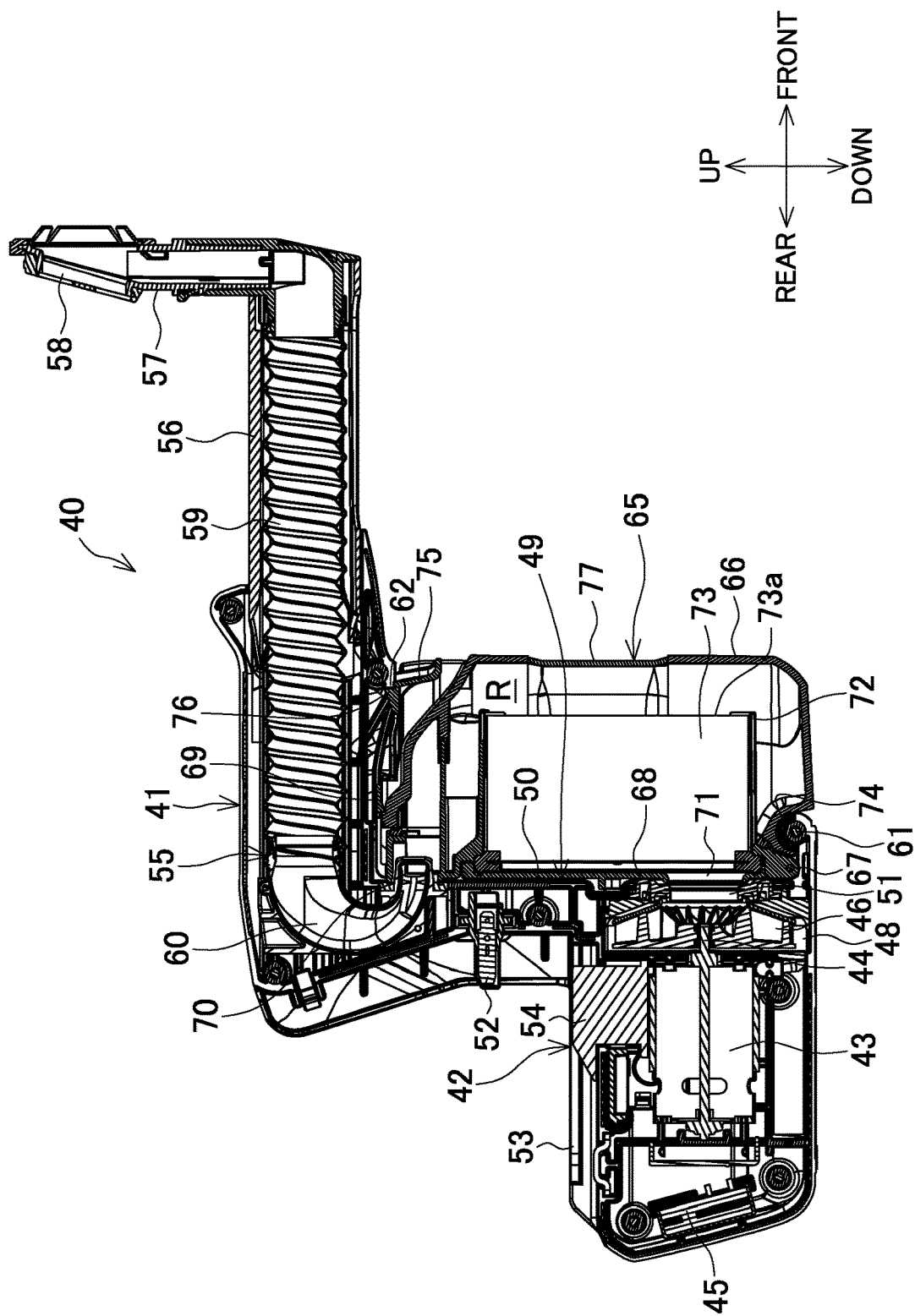
FIG. 2 is a center vertical cross-sectional view of the dust collector for electric power tool in the embodiment 1.

The dust collector 40 includes, as illustrated in FIG. 2, a casing 41 having an L shape in side view formed by assembling right and left half casings, and on the rear upper portion, a fitting depressed portion 42 is formed to fit to the mounting portion 24 of the hammer drill 1. A dust collection motor 43 with an output shaft 44 facing forward is housed to face forward in a rear lower portion of the casing 41, and a dust collection controller 45 is disposed rearward the dust collection motor 43. A dust collection fan 46 is fixedly secured to the output shaft 44, and is housed in an intake air chamber 48 that is defined in the casing 41 and includes exhaust outlets 47, 47 . . . (FIG. 13) on side surfaces. A joint 49 of a dust box 65 is formed ahead of the intake air chamber 48 at the lower portion on the front surface of the casing 41, and the joint 49 has a depressed shape while the front side is open. A communication hole 51 is provided to a partition wall 50 as a bottom of the joint 49 on the rear side, and the communication hole 51 communicates the joint 49 with the intake air chamber 48 coaxially with the dust collection fan 46.

Plate-shaped three male terminals 52, 52 . . . for power source and communication are arranged side by side at predetermined intervals in the right-left direction on an upper rear surface of the casing 41, and project rearward.

On both right and left sides on a rear top surface of the casing 41, a pair of guide rails 53, 53, which are fittable to the guide grooves on the right and left side surfaces of the mounting portion 24, are disposed upright in the front-rear direction. Between the guide rails 53, 53 on the rear top surface of the casing 41, a push-up member 54 is disposed having a rear surface as a surface inclined rearward and downward, and the push-up member 54 enters the lower depressed portion 31 in the fitted state of the mounting portion 24 to push the press bar 30 upward.

On the on upper side of the joint 49 inside the casing 41, a guide passage 55 is formed in the front-rear direction, and the guide passage 55 has an open front end and a rear end bent in a U shape to go around to the rear of the joint 49. To the guide passage 55, a slide tube 56 is coupled in a state of being movable in the front-rear direction and biased to project, and an L-shaped nozzle 57 having a tip facing upward is coupled to the front end of the slide tube 56. At the tip of the nozzle 57, a tubular suction opening portion 58 through which the bit coaxially passes is formed.

The guide passage 55 and the slide tube 56 internally houses a flexible hose 59 whose front end is coupled to the nozzle 57, and a rear end of the flexible hose 59 is coupled to a tubular duct 60 folded in a U shape along the shape of the rear end of the guide passage 55. The duct 60 has a lower end portion passing through the partition wall 50 to project inside the joint 49. At the lower end of the joint 49 ahead of the partition wall 50, a receiving shaft 61 in the right-left direction is disposed to protrude, and a lock protrusion 62 locked to the upper side of the dust box 65 is formed at a position close to the front side on an upper inner surface of the joint 49.

Figure 3:
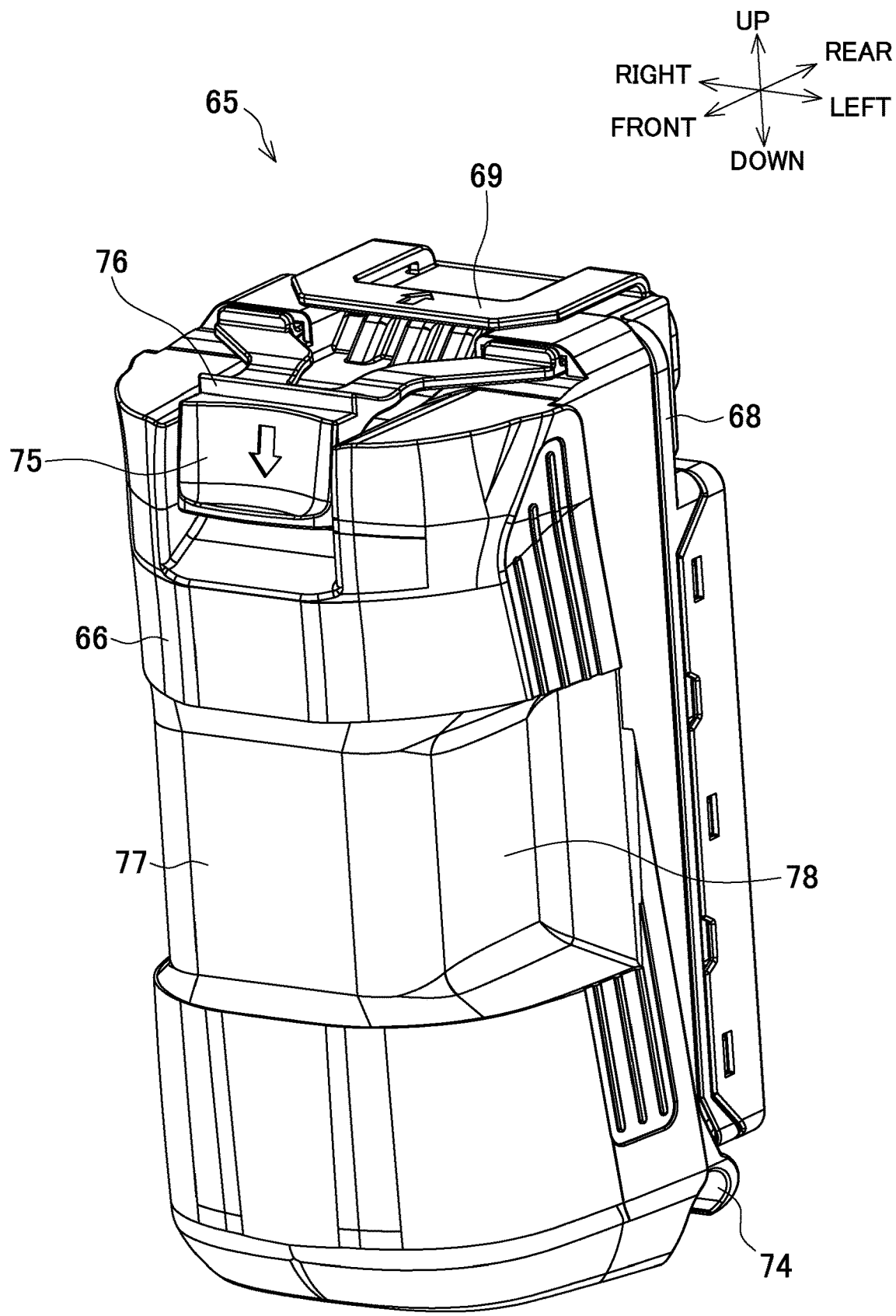
FIG. 3 is a perspective view of a dust box in the embodiment 1.
Figure 4B:
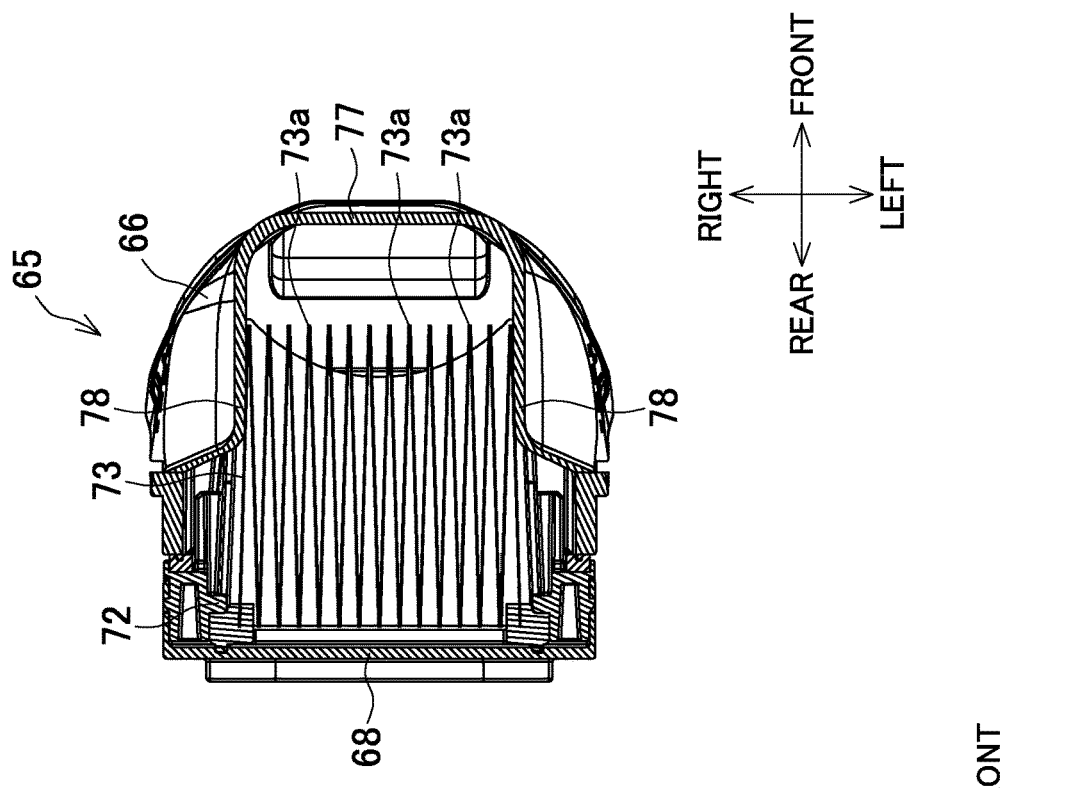
FIG. 4B is a cross-sectional view taken along the line A-A of FIG. 4A.
Figure 4A:
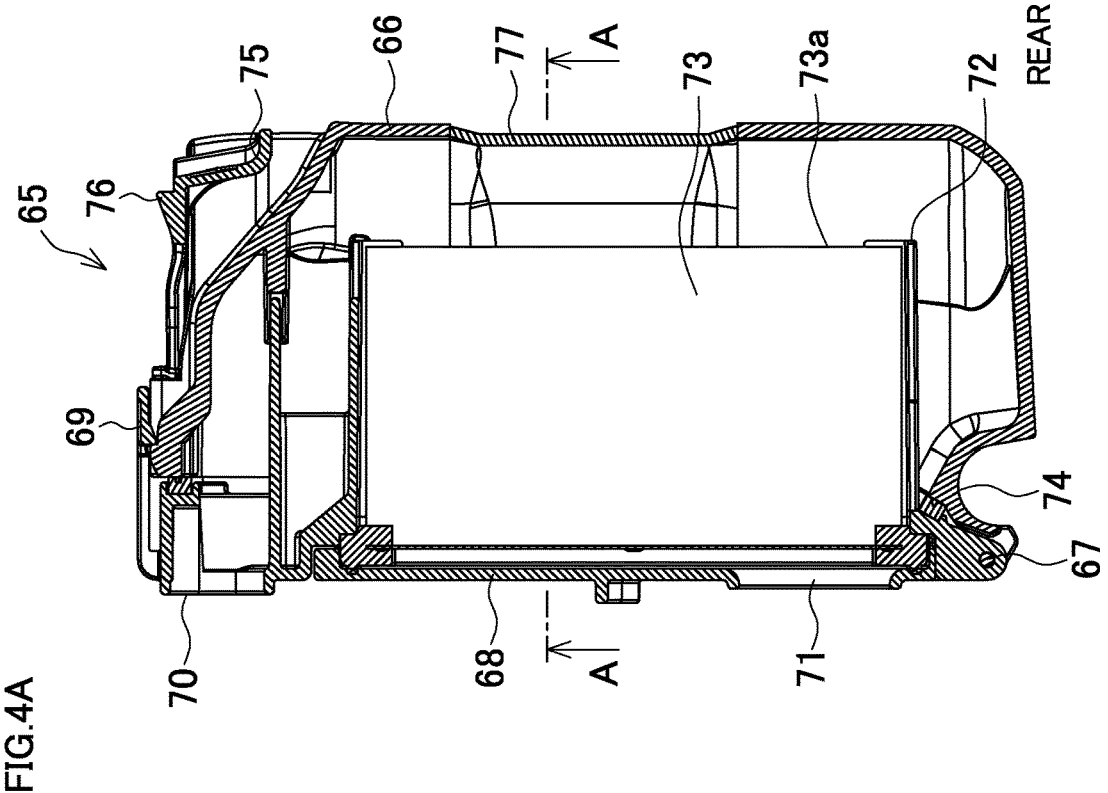
FIG. 4A is a center vertical cross-sectional view of the dust box in the embodiment 1.
Figure 5:
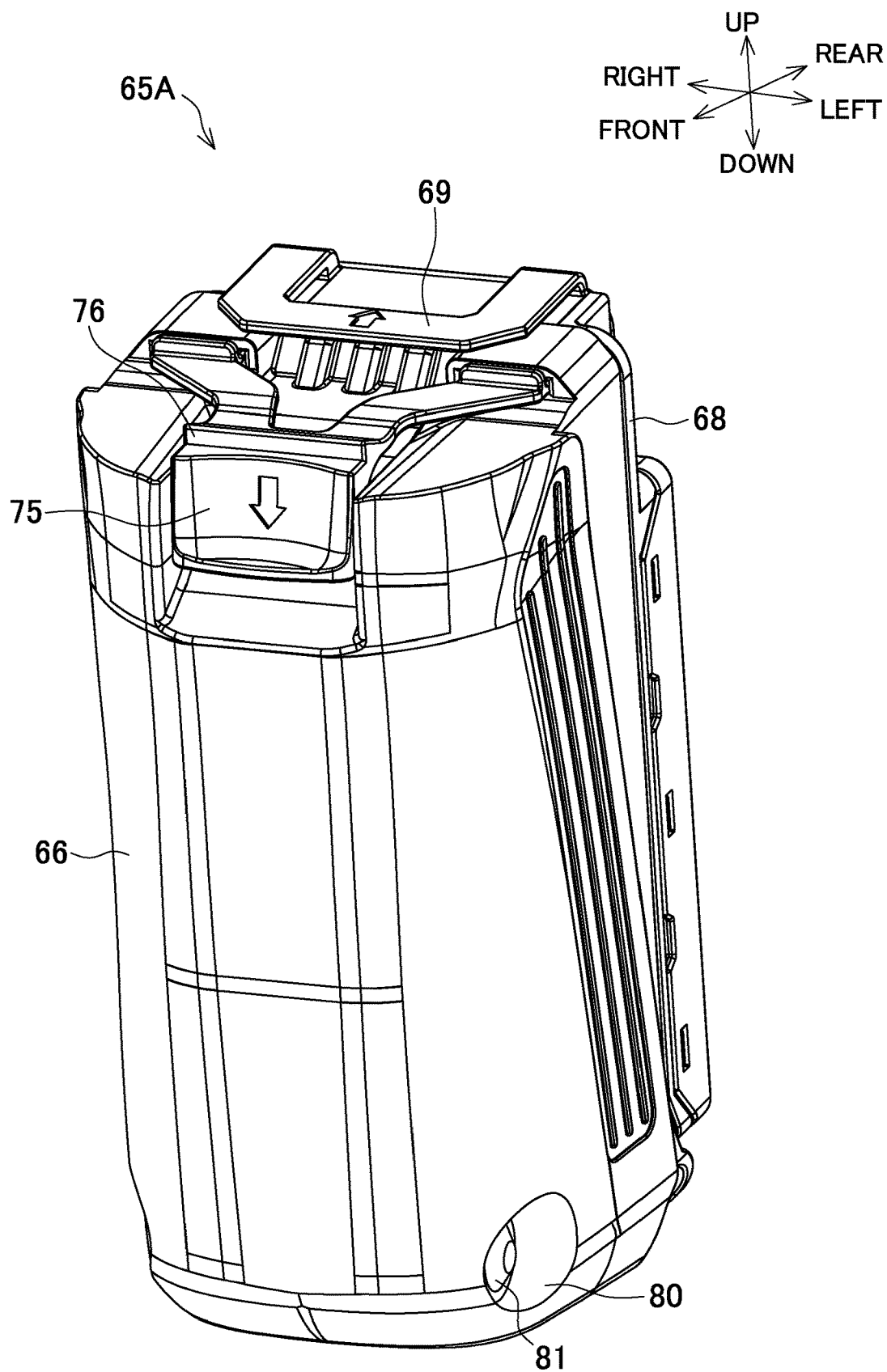
FIG. 5 is a perspective view of a dust box in an embodiment 2.
Figure 6:
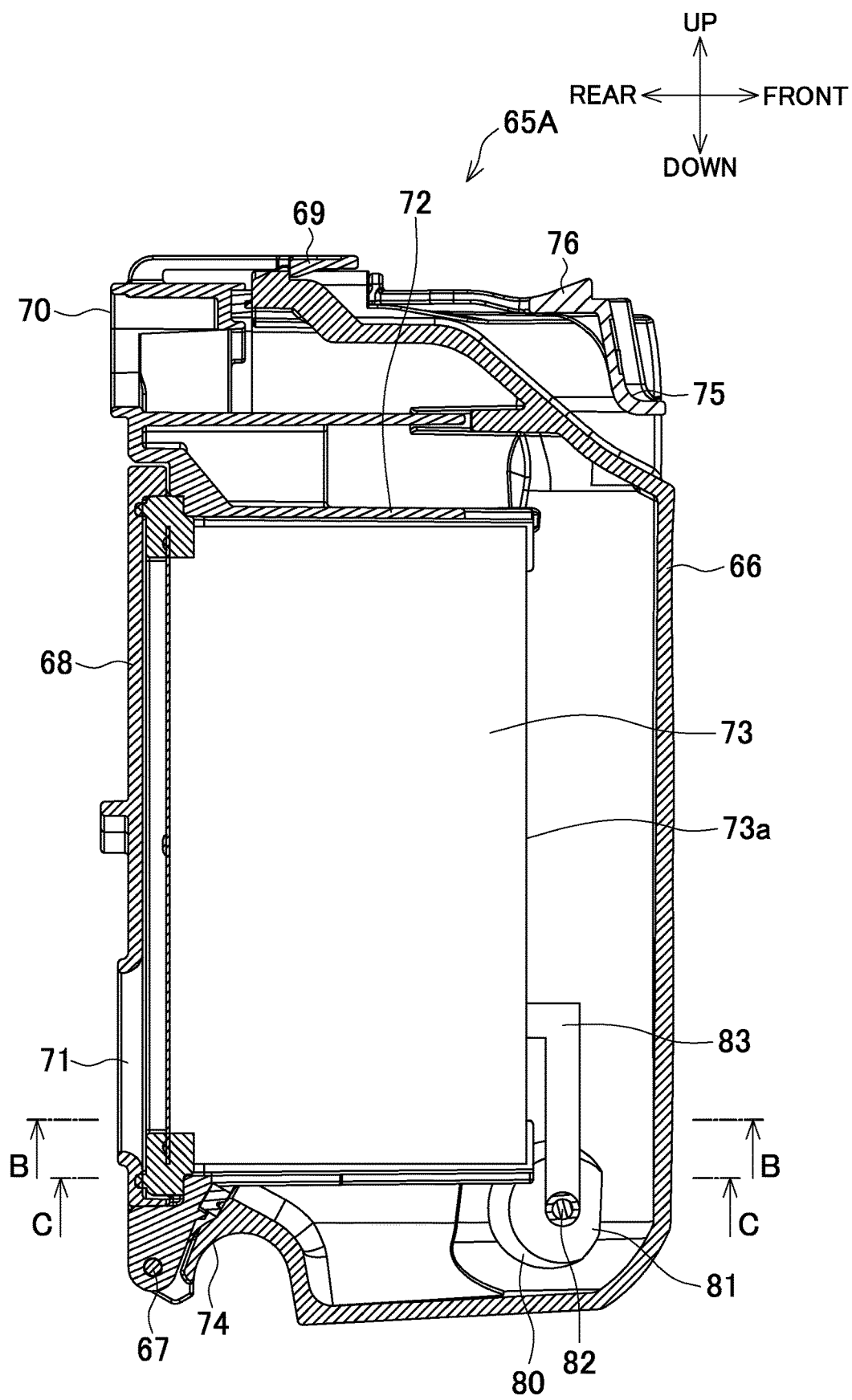
FIG. 6 is a center vertical cross-sectional view of the dust box in the embodiment 2.
Figure 7A:
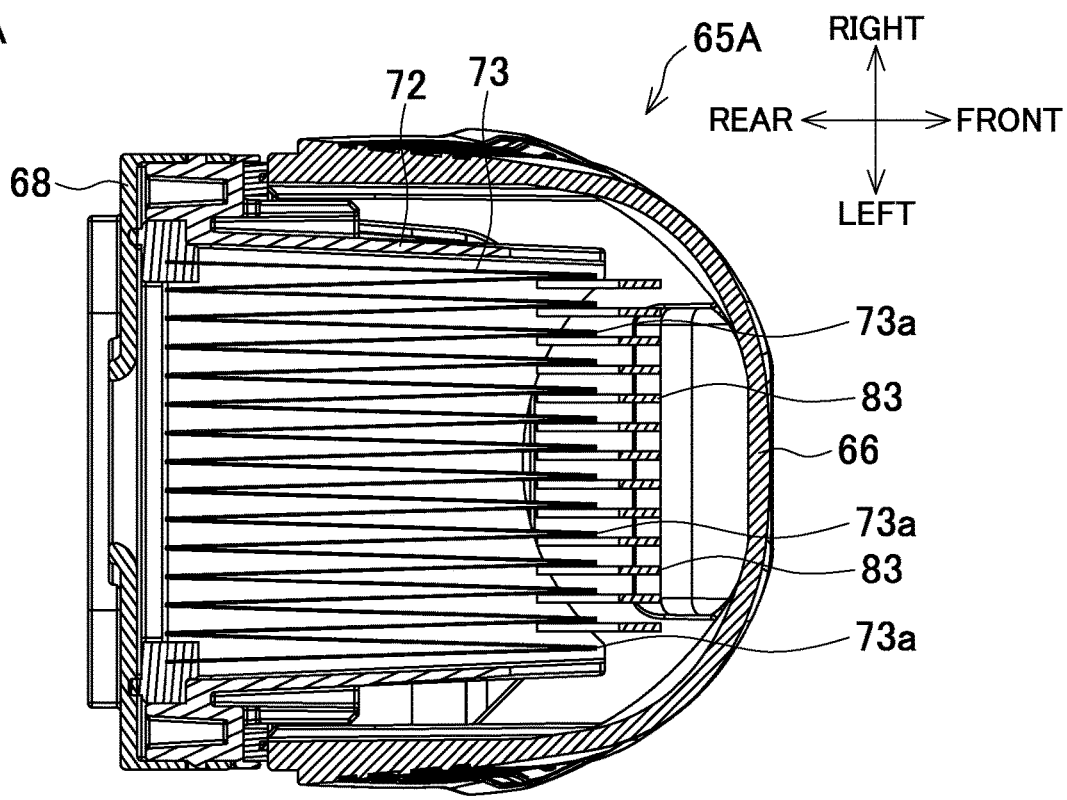
FIG. 7A is a cross-sectional view taken along the line B-B of FIG. 6.
Figure 7B:
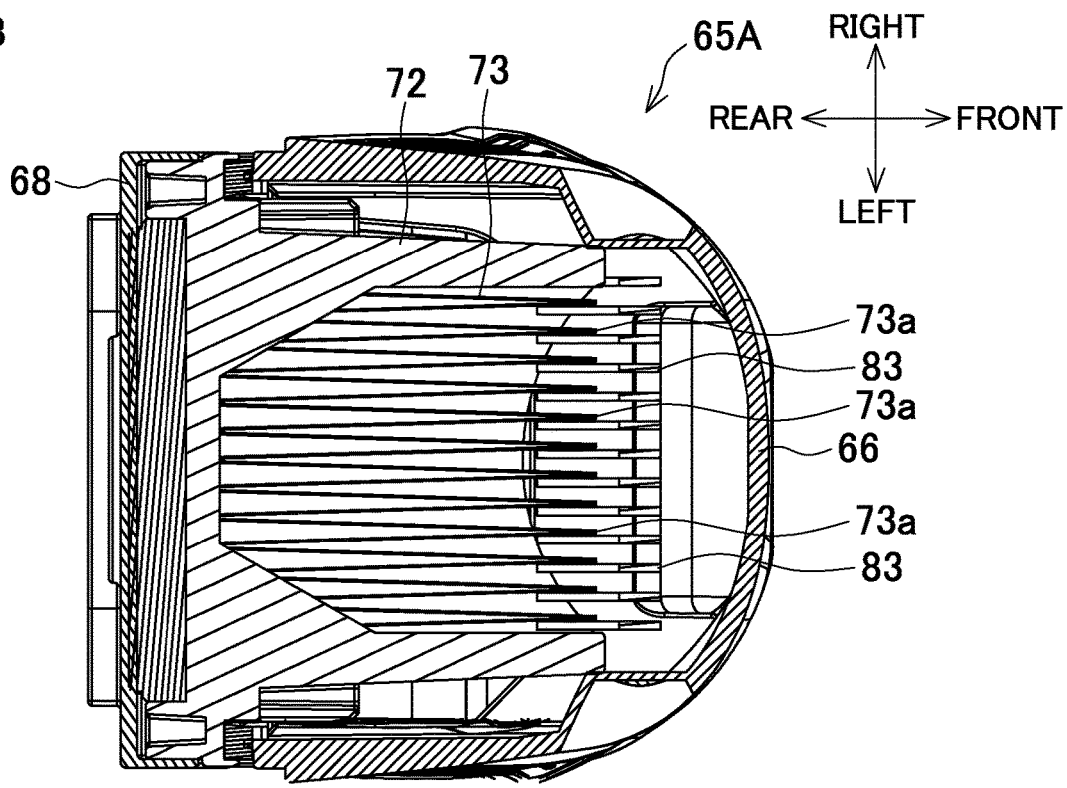
FIG. 7B is a cross-sectional view taken along the line C-C of FIG. 6.
Figure 10A:
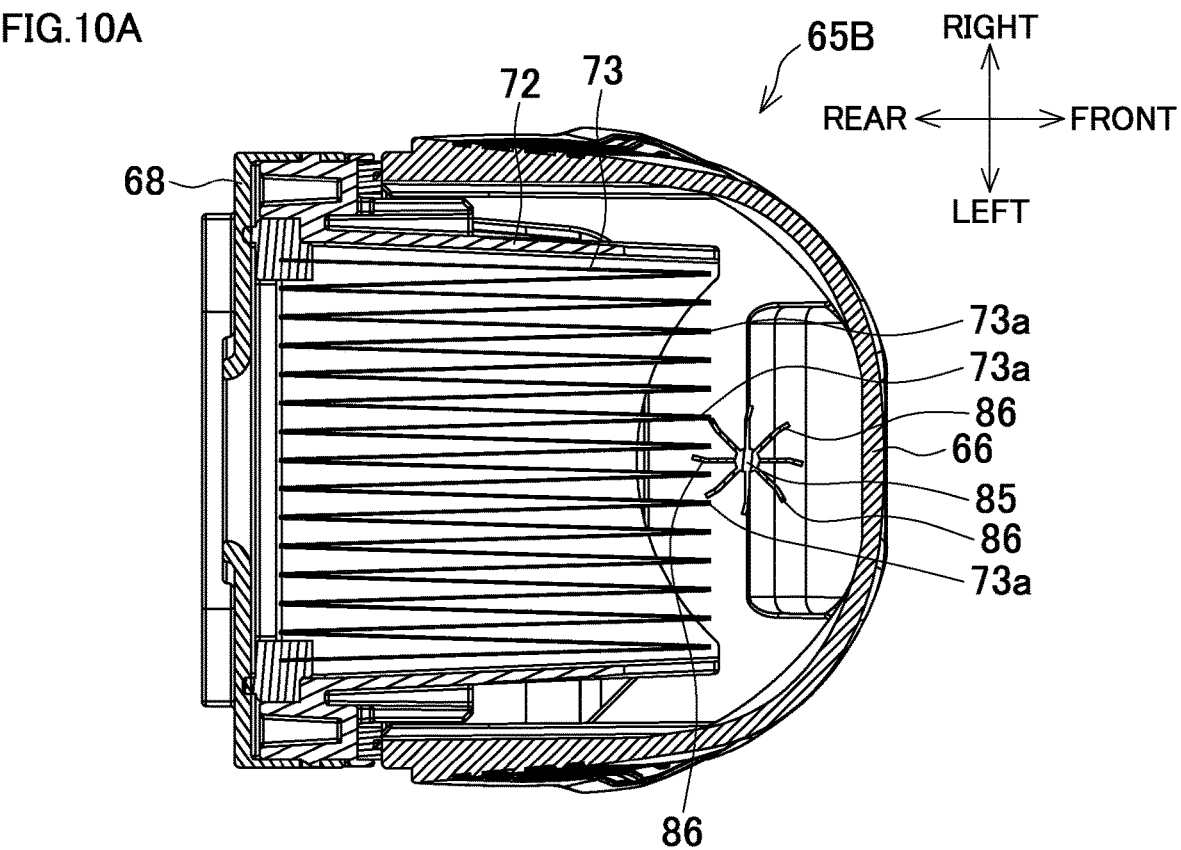
FIG. 10A is a cross-sectional view taken along the line D-D of FIG. 9B.
Figure 10A:
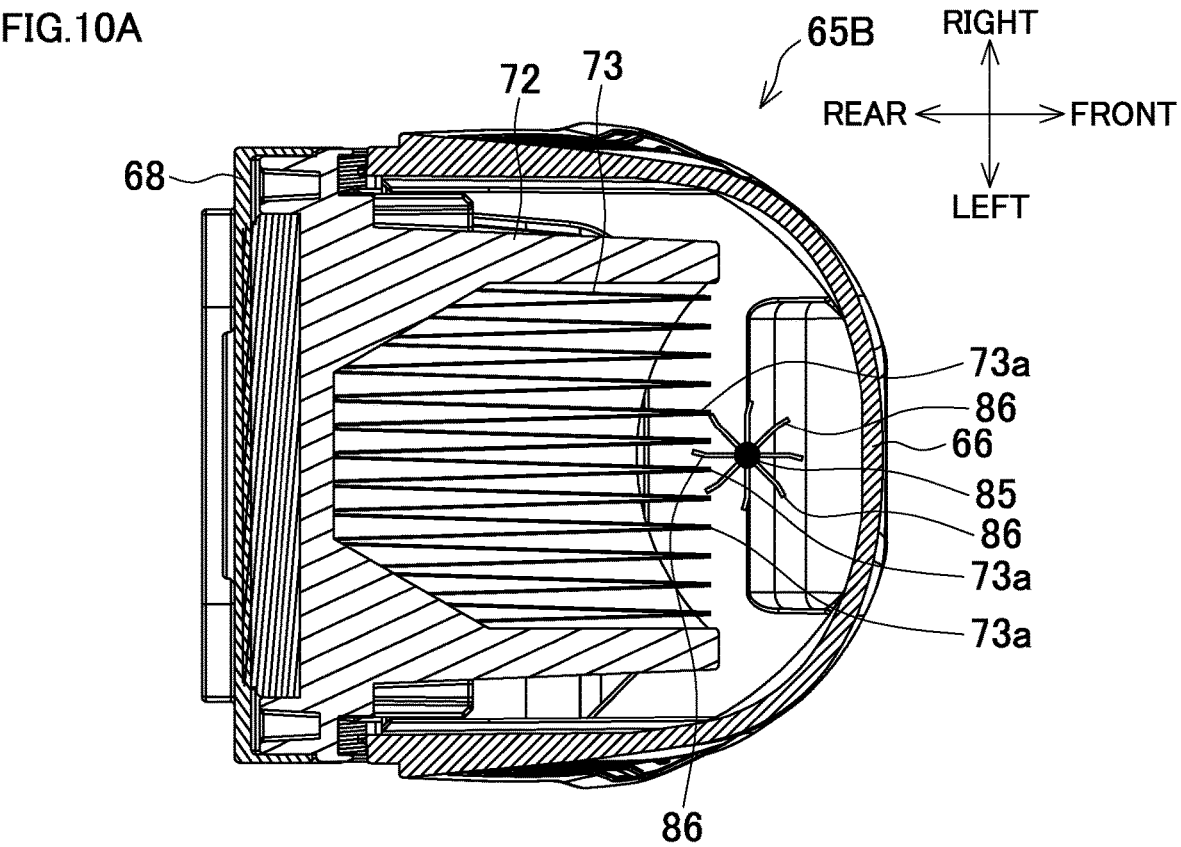

As illustrated in FIGS. 3, 4A and 4B, the dust box 65 includes a box main body 66 that has an open rear surface and has a deep bottom box shape and a lid body 68 in a vertically long rectangular shape rotatably coupled to the lower side of the box main body 66 by a hinge shaft 67 on the open side. For the dust box 65 alone, a description will be given with the front-back, right-left, and up-down directions identical to those in a state of being mounted to the hammer drill 1.

To the upper end portion of the lid body 68, a loop-shaped lock portion 69 is disposed, and the lock portion 69 is engaged with the top surface of the box main body 66 in a state where the opening of the box main body 66 is closed and keeps the closed state. On the upper end side of the lid body 68, an inlet 70 in a laterally long rectangular shape is disposed, and the lower end portion of the duct 60 is inserted into the inlet 70 in a state of being mounted to the joint 49. On the lower end side, an outlet 71 in a circular shape is formed, and the outlet 71 is opposed to the communication hole 51 in, similarly, the state of being mounted. At a position covering the outlet 71, a filter housing portion 72, which holds a paper filter 73 folded in the right-left direction having a fold in the up-down direction, is disposed to protrude into the box main body 66. In the state, the filter 73 has mountain folded portions 73a, 73a, . . . , which are formed in the up-down direction on the front surface, exposed at regular intervals in the right-left direction, and the right and left surfaces are also exposed inside the box main body 66.

On the lower surface of the box main body 66, a groove 74 fitted to the receiving shaft 61 of the joint 49 is formed, and on the upper surface, an operation piece 75 that includes a protrusion 76 elastically locked to the lock protrusion 62 of the joint 49 is formed.

While the box main body 66 is made of a resin, only a region across the front surface and right and left side surfaces having a predetermined width on an intermediate portion in a longitudinal direction, which is the outer side of the filter housing portion 72, is made of a rubber 77 as a vulcanized and bonded elastic member. On right and left side surfaces of the rubber 77, recesses 78, 78 are formed to be inwardly depressed with respect to the resin part to abut on the side surface of the filter 73. Accordingly, by pinching the right and left recesses 78, 78 from both sides to press inward, the rubber 77 is elastically deformed to abut on the filter 73, thus ensuring directly deforming the filter 73 in the right-left folding direction. The rubber 77 may be mounted by, for example, a recess-projection fitting of the end portion of the rubber 77 into the opening formed at a corresponding region of the box main body 66, not limited to the vulcanization bonding. The same applies to a rubber in an embodiment 2.

By pushing thus formed dust box 65 into the joint 49 so as to be erected from an oblique posture where the lid body 68 is faced rearward and the groove 74 is fitted to the receiving shaft 61 from the front side, the protrusion 76 of the operation piece 75 is locked to the lock protrusion 62 to mount the dust box 65 to the joint 49. In the mounting state, the distal end portion of the duct 60 is fitted to the inlet 70 and projects to the inside of the box main body 66, and the outlet 71 is opposed to the communication hole 51, thereby providing the communication with the intake air chamber 48. Accordingly, in the dust collector 40, a dust collecting route R (FIGS. 1, 2) is formed from the suction opening portion 58 to the intake air chamber 48 passing through the filter 73 in the box main body 66 via the nozzle 57, the flexible hose 59, and the duct 60.

In the hammer drill 1 and the dust collector 40 configured as described above, when the dust collector 40 is mounted to the hammer drill 1, the guide rails 53, 53 of the casing 41 are mated to the lower portion of the mounting portion 24 of the hammer drill 1 to position the mounting portion 24 on the rear portion of the casing 41. In such a state, the dust collector 40 is slid rearward so as to fit the fitting depressed portion 42 to the mounting portion 24 from the front. Then, the guide rails 53, 53 fit to the right and left guide grooves of the mounting portion 24 and the mounting portion 24 is coupled between the guide rails 53, 53. At the same time, the push-up member 54 enters the lower depressed portion 31 to push up the press bar 30 and swings the connector 26 to an upper limit position at which the shutter portion 29 is retreated upward to be opposed to the insertion port 27. Accordingly, the male terminal 52 of the dust collector 40 enters into the housing 2 from the insertion port 27, and is electrically coupled to the female terminal of the connector 26 (FIG. 1).

Then, in a set state where the suction opening portion 58 is pressed against a surface to be processed of a workpiece, turning the switch 19 ON by performing a push-in operation of the switch lever 20 of the hammer drill 1 drives the motor 3 to rotate the intermediate shaft 6. At the time, operating a switching knob (not illustrated) disposed on the side surface of the housing 2 causes the clutch 8 to slide to select any one of an advance position, a retreated position, and an intermediate position. The advance position is a position where the clutch 8 engages only with the first gear 7, a retreated position is a position where the clutch 8 engages only with the boss sleeve 9, and an intermediate position is a position where the clutch 8 simultaneously engages with the first gear 7 and the boss sleeve 9. Thus, a selection of a drill mode, a hammer mode, and a hammer drill mode can be made. The drill mode is a mode in which the tool holder 10 rotates via the second gear 17 to rotate the bit. The hammer mode is a mode in which the piston cylinder 11 is caused to reciprocate by a swing of the arm 13 and the striker 15 in conjunction with the piston cylinder 11 hammers the bit via the impact bolt 16. The hammer drill mode is a mode in which the rotation of the tool holder 10 and the hammering of the impact bolt 16 are simultaneously performed. When the hammer drill 1 is caused to make a forward movement in a state where the suction opening portion 58 is set, the slide tube 56 retreats together with the nozzle 57, and the bit passes through the suction opening portion 58 to be able to process the workpiece.

By turning the switch 19 ON, the controller 25 supplies electric power to the dust collection controller 45 of the dust collector 40. Then, the dust collection controller 45 drives the dust collection motor 43 to rotate the dust collection fan 46. Accordingly, an external air is suctioned from the suction opening portion 58 and discharged inside the dust box 65 passing through the flexible hose 59 and the duct 60 from the nozzle 57. Subsequently, the external air passes through the filter housing portion 72 to reach the intake air chamber 48 from the outlet 71 via the communication hole 51, and is discharged outside from the exhaust outlet 47. Therefore, the dust generated from the workpiece is suctioned by the suction opening portion 58, enters inside the dust box 65 via the nozzle 57, the flexible hose 59, and the duct 60, and is captured by the filter 73 when passing through the filter housing portion 72, thereby being accumulated inside the box main body 66.

When the push-in of the switch lever 20 is released to turn the switch 19 OFF, the motor 3 stops and the rotation and the like of the bit stop. However, since the controller 25 has a delay function to stop the energization of the dust collector 40 with a delay by several seconds from the tuning the switch 19 OFF, in the dust collector 40, the dust collection fan 46 continues to rotate for several seconds after the bit stop. Accordingly, the dust remaining in the nozzle 57, the flexible hose 59, and the like also can be surely collected in the dust box 65.

Then, in removal of the dust collector 40, conversely to the mounting, by sliding the dust collector 40 forward from the hammer drill 1, the fitting depressed portion 42 is released from the mounting portion 24, and the male terminal 52 is separated from the connector 26 and pulled out from the insertion port 27. The connector 26 returns to the lower limit position and the shutter portion 29 closes the insertion port 27.

In disposal of the dust accumulated in the dust box 65, the dust box 65 can be removed from the joint 49 by pressing down the operation piece 75 to release the lock of the protrusion 76 to the lock protrusion 62 and directly bringing the upper side down forward around the receiving shaft 61. Accordingly, by releasing the lock portion 69 of the lid body 68 from the box main body 66 to open the lid body 68, the dust can be disposed from the opening of the box main body 66.

Before the disposal, when the recesses 78, 78 of the rubber 77 of the box main body 66 are sandwiched from both sides to elastically deform the recesses 78, 78 in a manner of pushing inward for multiple times, the filter 73 expands and contracts in the folding direction. Therefore, the dust accumulated on the filter 73 can be removed inside the box main body 66. The dust removal can be performed also by vibrating the filter 73 by flicking or hitting the recess 78 with a finger in addition to sandwiching the recesses 78, 78. Not limited to the timing of disposing the dust, the dust removal may be performed at an interval of the machining work.

As described above, according to the dust collector 40 and the hammer drill 1 of the embodiment 1, by disposing a dust removal means (rubber 77) configured to directly act to the filter 73 from outside the dust box 65 to remove the dust accumulated on the filter 73, the expansion and contraction, the vibration, and the like of the filter 73 can be directly performed with the rubber 77, thus ensuring the effective dust removal at ease. Accordingly, clogging of the filter 73 can be easily avoided at low cost.

Especially, here, since the dust removal means is an elastic member (rubber 77) that forms a part of the dust box 65 and has an inner surface abutting on the filter 73, the vibration and the like can be easily applied to the filter 73 from outside using the part of the dust box 65. The dust removal means does not project outside the dust box 65 and does not become a hindrance.

The filter 73 is folded in the right-left direction, the rubber 77 forms a part of the dust box 65 including the right and left side surfaces, and the inner surface of the rubber 77 abuts on the right and left side surfaces of the filter 73. Therefore, the filter 73 can be easily expanded and contracted or vibrated by the operation of the rubber 77 from outside.

In the above-described embodiment, the inner surface of the rubber abuts on the side surfaces of the filter in an ordinary state. However, the inner surface of the rubber may be positioned at the proximity without contact in the ordinary state, and the rubber may abut on the side surface of the filter by an inward elastic deformation. Accordingly, the recess is not necessary to be provided.

The rubber formed region is not limited to the region across the front surface and the right and left side surfaces having the predetermined width of the dust box, and for example, the rubber may be separately formed only on the right and left side surfaces while the front surface is omitted, or may be formed on only one side surface of the right and the left. Furthermore, depending on the form of the filter, the rubber can be formed on the top surface and the bottom surface of the dust box.

Next, other embodiments of the invention will be described. However, like reference numerals designate identical components of the hammer drill 1, the casing 41 of the dust collector 40, and the like to omit overlapping descriptions. A dust box 65A of an embodiment 2 will be described below.

In the dust box 65A illustrated in FIGS. 5 to 7B, on the right and left side surfaces of the front lower portion of the box main body 66, a pair of right and left operation holes 80, 80 are penetratingly formed, and respective rubbers 81, 81 are vulcanized and bonded in a manner of covering both operation holes 80. Between the right and left rubbers 81, 81 inside the box main body 66, a support shaft 82 is bridged in the right-left direction, and a plurality of dust removal plates 83, 83, . . . are secured to the support shaft 82 at predetermined intervals in a comb shape. The plurality of dust removal plates 83, 83, . . . have inverted L shape in side view standing upward and subsequently bending rearward. The dust removal plates 83 have respective rear ends inserted between the mountain folded portions 73a, 73a, . . . on the front surface of the filter 73 to abut on the side surfaces of the mountain folded portions 73a, 73a, . . . .

In the dust box 65A configured as described above, by placing fingers to sandwich the rubbers 81, 81 from the right and left operation holes 80, 80, and directly swinging to right and left, the rubbers 81, 81 can be elastically deformed to slide the support shaft 82 to right and left in the box main body 66. Since the slide causes the respective dust removal plates 83 to interfere with the mountain folded portions 73a of the filter 73 to swing each mountain folded portion 73a to right and left, the dust accumulated on the filter 73 can be removed inside the box main body 66.

When the dust inside the box main body 66 is disposed, since opening the lid body 68 as illustrated in FIGS. 8A and 8B relatively pulls out the dust removal plates 83, 83, . . . inside the box main body 66 from between the mountain folded portions 73a, 73a, . . . , the operation of the lid body 68 is not obstructed. After the disposal of the dust, when the lid body 68 is closed, the respective dust removal plates 83 are inserted between the mountain folded portions 73a, 73a, . . . again.

As described above, according to also the dust collector 40 and the hammer drill 1 of the embodiment 2, by disposing a dust removal means (dust removal plate 83 as a dust removal member) configured to directly act to the filter 73 from outside the dust box 65A to remove the dust accumulated on the filter 73, the filter 73 can be, for example, directly swung by the dust removal plate 83, thus ensuring the effective dust removal at ease. Accordingly, clogging of the filter 73 can be easily avoided at low cost.

Especially, here, since the dust removal means is the dust removal plate 83 that is disposed to abut on the filter 73 inside the dust box 65A and configured to be operated from outside the dust box 65A, the vibration and the like can be surely and easily applied to the filter 73. The dust removal plate 83 is not exposed outside the dust box 65A and does not become a hindrance.

Since the dust removal plates 83 are configured to be moved in an intersecting direction with the mountain folded portions 73a, 73a, . . . by the operation from outside, the filter 73 folded in the right-left direction can be efficiently swung.

Furthermore, since the dust removal plates 83 are inserted between the mountain folded portions 73a, 73a, . . . of the filter 73, the dust removal plates 83 can be surely abutted on the mountain folded portions 73a, 73a, . . . to be swung.

The number and the shape of the dust removal plate are not limited to the above-described embodiment. For example, not the L shape but an arc shape or a linear shape may be employed, or not abutting on the mountain folded portion but positioning at the proximity may be employed in the ordinary state.

The rubber that supports the support shaft may be disposed at any one instead of disposing at both right and left ends. Not limiting to the structure supporting via the rubber, the following structures may be employed, such as a structure where both ends of the support shaft are projected from the right and left side surfaces of the box main body and the both ends of the support shaft are gripped to be slid right and left, and a structure where a large diameter portion is disposed at any one of the right and left projecting ends of the support shaft, a coil spring is externally mounted between the side surface of the box main body and the large diameter portion, and the support shaft is slid by a press operation of the large diameter portion. The location of the support shaft may be upper side compared with that of the above-described embodiment.

An embodiment 3 of the invention will be described below.

In a dust box 65B illustrated in FIGS. 9A to 10B, a rotation shaft 85 is disposed in the up-down direction ahead of the filter 73 in the center in the right-left direction inside the box main body 66. At the upper end of the rotation shaft 85, a plurality of dust removal blades 86, 86, . . . are mounted in the radiation direction. The dust removal blade 86 is formed of a material, such as a resin and a rubber, having flexibility, and a rotation locus of the tip of the dust removal blade 86 is configured to intersect with the plurality of mountain folded portions 73a, 73a, . . . on the front surface of the filter 73 in plan view. The rotation shaft 85 has a lower end that passes through the lower portion of the box main body 66 to project to the lower side, and an operation dial 87 that allows a rotating operation from the outside of the dust box 65B is disposed to the lower end of the rotation shaft 85.

In the dust box 65B configured as described above, by the rotation operation of the operation dial 87 on the lower side of the box main body 66 in any of the clockwise or the counterclockwise direction, the rotation shaft 85 rotates inside the box main body 66, and in accordance with it, the dust removal blades 86, 86, . . . rotate. Since the rotation of the dust removal blade 86 causes the respective dust removal blades 86 to abut on the mountain folded portions 73a of the filter 73 to provide swing or vibration, the dust accumulated on the filter 73 can be removed inside the box main body 66.

As described above, according to also the dust collector 40 and the hammer drill 1 of the embodiment 3, by disposing a dust removal means (dust removal blade 86 as a dust removal member) configured to directly act to the filter 73 from outside the dust box 65B to remove the dust accumulated on the filter 73, the filter 73 can be directly swung or vibrated by the dust removal blade 86, thus ensuring the effective dust removal at ease. Accordingly, clogging of the filter 73 can be easily avoided at low cost.

Especially, here, since the dust removal member is the dust removal blade 86 rotated by the operation from outside, the dust removal of the filter 73 can be performed by the simple rotating operation.

The number and the shape of the dust removal blade are not limited to the above-described embodiment, and can be changed as necessary. The size is changeable, and the length can be changed for each dust removal blade. While the dust removal blade is disposed only to the upper end of the rotation shaft in the above-described embodiment, the dust removal blades may be radially mounted at a respective plurality of positions in the up-down direction by extending the rotation shaft upward, thereby causing the dust removal blades to abut on the mountain folded portions at the plurality of positions. In the case, the size of the dust removal blade and the number of the blades can be changed for each mounting position (for example, the size of the blade can be increased or the number of the blades can increased on the center side of the filter compared with the lower end side). Furthermore, a plurality of rotation shafts may be arranged right and left, and the dust removal blades are disposed to the respective rotation shafts to allow the rotating operation. When the space allows, the rotation shaft may be passed through from not the lower side but the upper side.

An embodiment 4 of the invention will be described below.

Figure 11A:
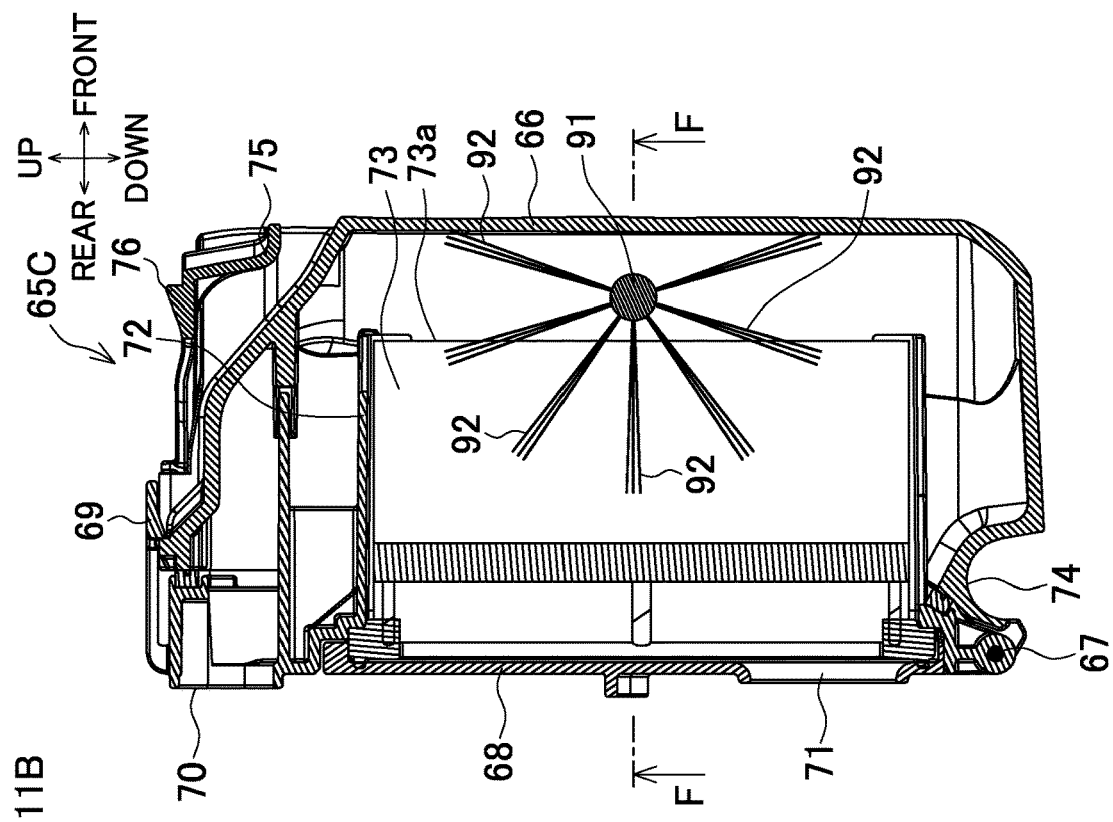
FIG. 11A is a perspective view of a dust box in an embodiment 4.
Figure 11B:
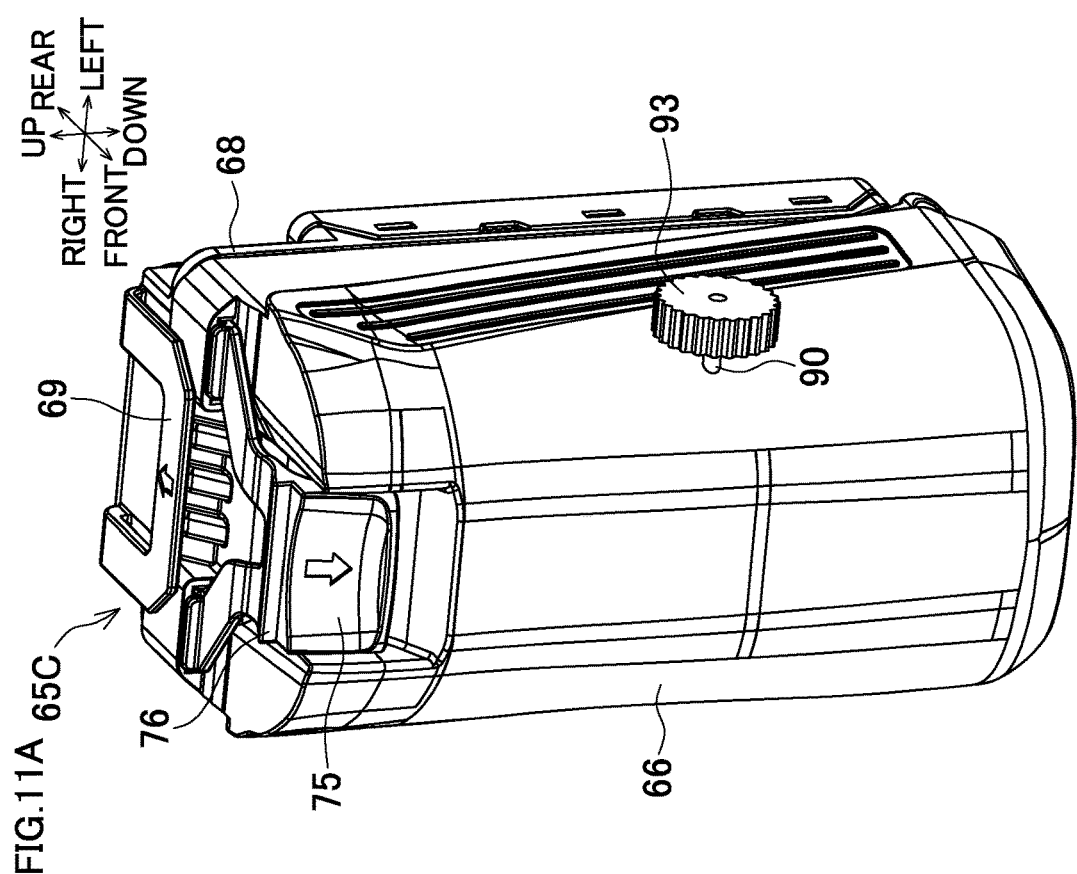
FIG. 11B is a center vertical cross-sectional view of the dust box in the embodiment 4.
Figure 12:
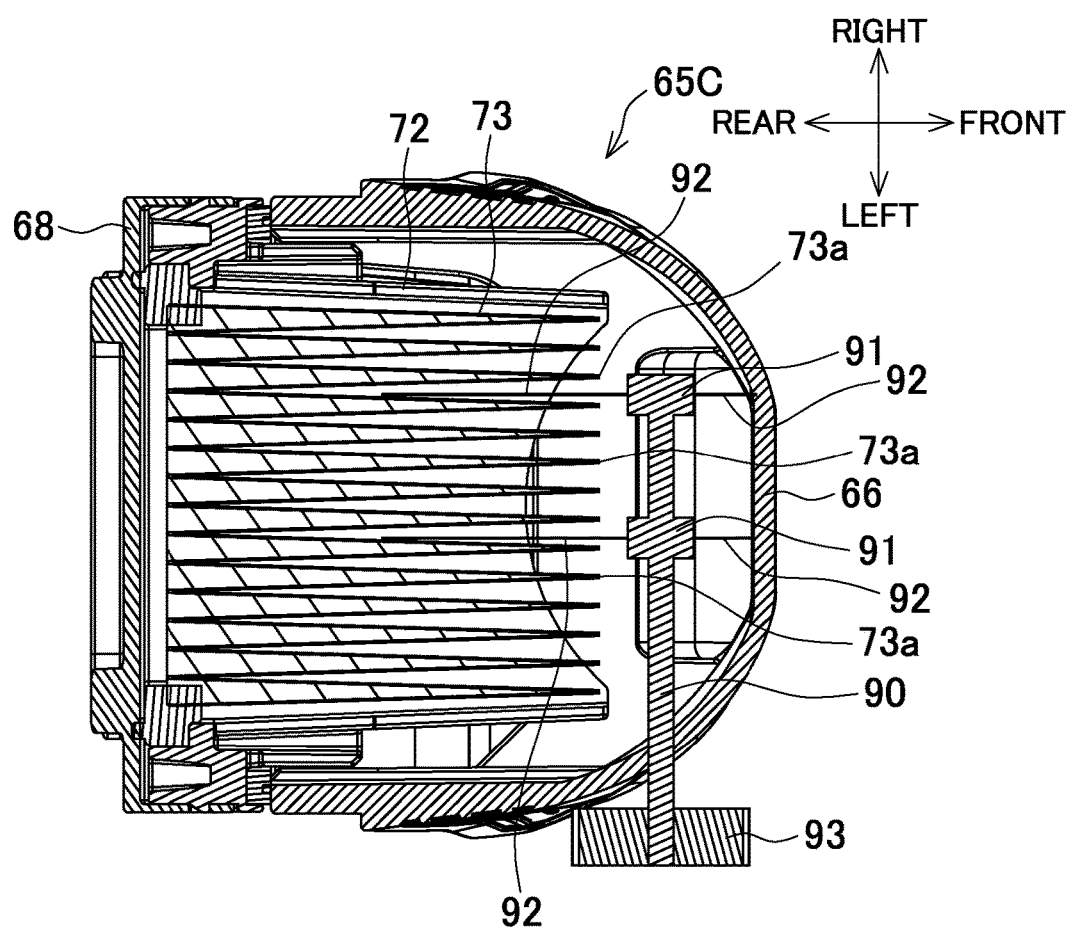
FIG. 12 is a cross-sectional view taken along the line F-F of FIG. 11B.

In a dust box 65C illustrated in FIGS. 11A, 11B and 12, a rotation shaft 90 is disposed in the right-left direction ahead of the filter 73 in the center in the up-down direction inside the box main body 66. The rotation shaft 90 is passed through the inside of the box main body 66 from the left side surface and rotatably cantilevered. In the box main body 66, large diameter portions 91, 91 having a lateral cross-sectional surface in a circular shape are formed with an interval in the right-left direction. The large diameter portions 91, 91 are disposed at the tip and an intermediate portion of the rotation shaft 90 positioned ahead of the filter 73. To the respective large diameter portions 91, 91, a plurality of dust removal brushes 92, 92, . . . formed of a bundle of brush hair are implanted in the radiation direction. The rotation locus of the tip of the dust removal brush 92 is configured to exceed the mountain folded portion 73a on the front surface of the filter 73 to reach the rear side in side view, and interfere with the right and left side surfaces of the mountain folded portion 73a. The rotation shaft 90 has a left end that passes through the side surface of the box main body 66 to project to the left side, and an operation dial 93 that allows a rotating operation from the outside of the dust box 65C is disposed to the left end of the rotation shaft 90.

In the dust box 65C configured as described above, by the rotation operation of the operation dial 93 on the side of the box main body 66 in any of the clockwise or the counterclockwise direction, the rotation shaft 90 rotates inside the box main body 66, and in accordance with it, the right and left large diameter portions 91, 91 rotate to rotate the dust removal brush 92, 92, . . . . Since the rotation of the dust removal brush 92 causes the respective dust removal brushes 92 to abut on the side surfaces of the mountain folded portions 73a of the filter 73 to provide swing or vibration, the dust accumulated on the filter 73 can be removed inside the box main body 66.

As described above, according to also the dust collector 40 and the hammer drill 1 of the embodiment 4, by disposing a dust removal means (dust removal brush 92 as a dust removal member) configured to directly act to the filter 73 from outside the dust box 65C to remove the dust accumulated on the filter 73, the filter 73 can be directly swung or vibrated by the dust removal brush 92, thus ensuring the effective dust removal at ease. Accordingly, clogging of the filter 73 can be easily avoided at low cost.

Especially, here, since the dust removal member is the dust removal brush 92 rotated by the operation from outside, the dust removal of the filter 73 can be performed by the simple rotating operation.

The number and the shape of the dust removal brush are also not limited to the above-described embodiment, and can be changed as necessary. The size is changeable, and the length can be changed for each dust removal brush. While the large diameter portions are disposed at two positions of the rotation shaft and the dust removal brushes are implanted to each of them in the above-described embodiment, the number of the large diameter portions also can be increased and decreased as necessary. The operation dial may be disposed at the opposite end portion of the rotation shaft, or may be disposed at both ends. Furthermore, a plurality of rotation shafts to which the dust removal brushes are implanted may be disposed in an arrangement of up and down, and each allow the rotating operation.

An embodiment 5 of the invention will be described below.

Figure 13:
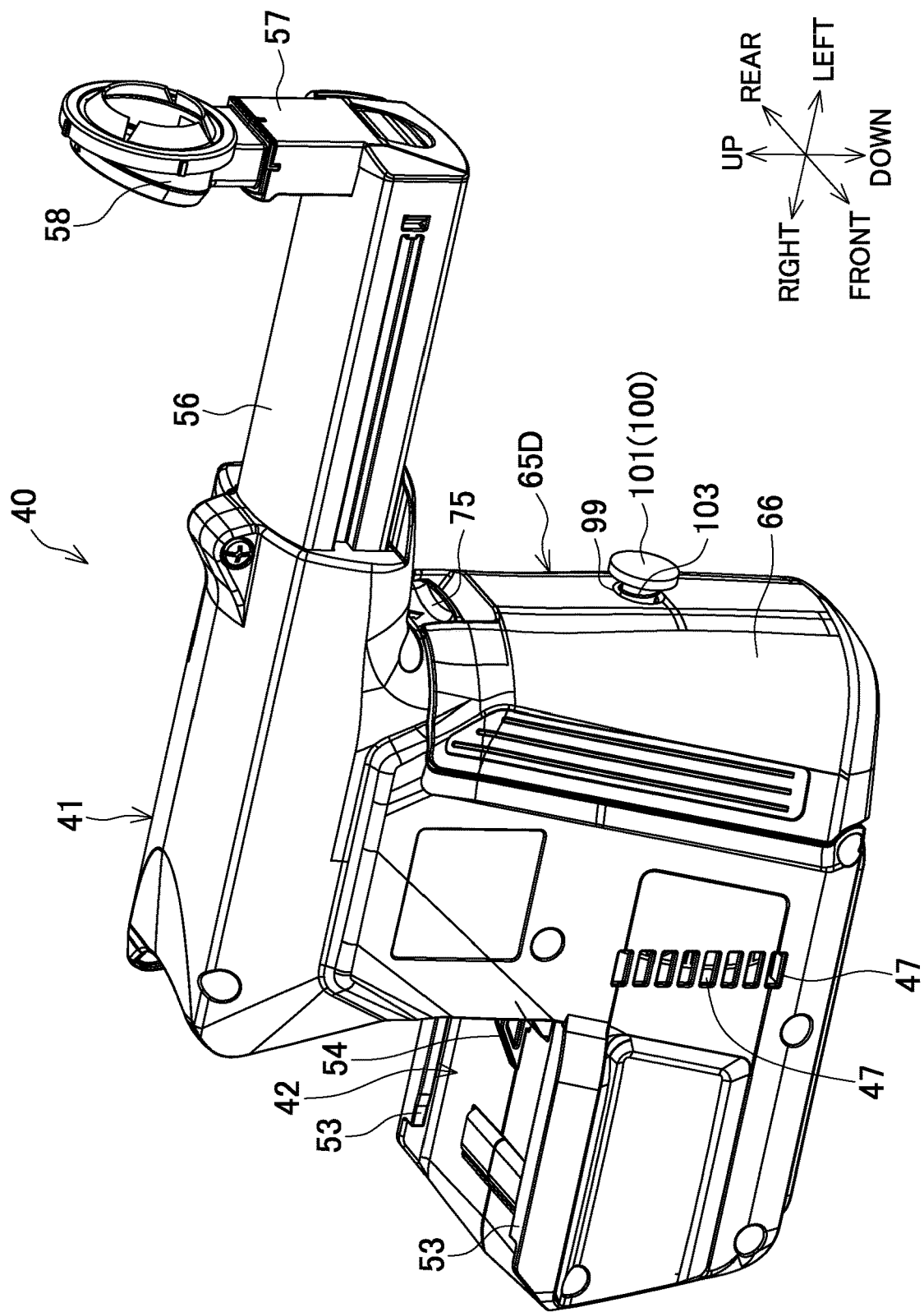
FIG. 13 is a perspective view of a dust collector for electric power tool in an embodiment 5.
Figure 14:
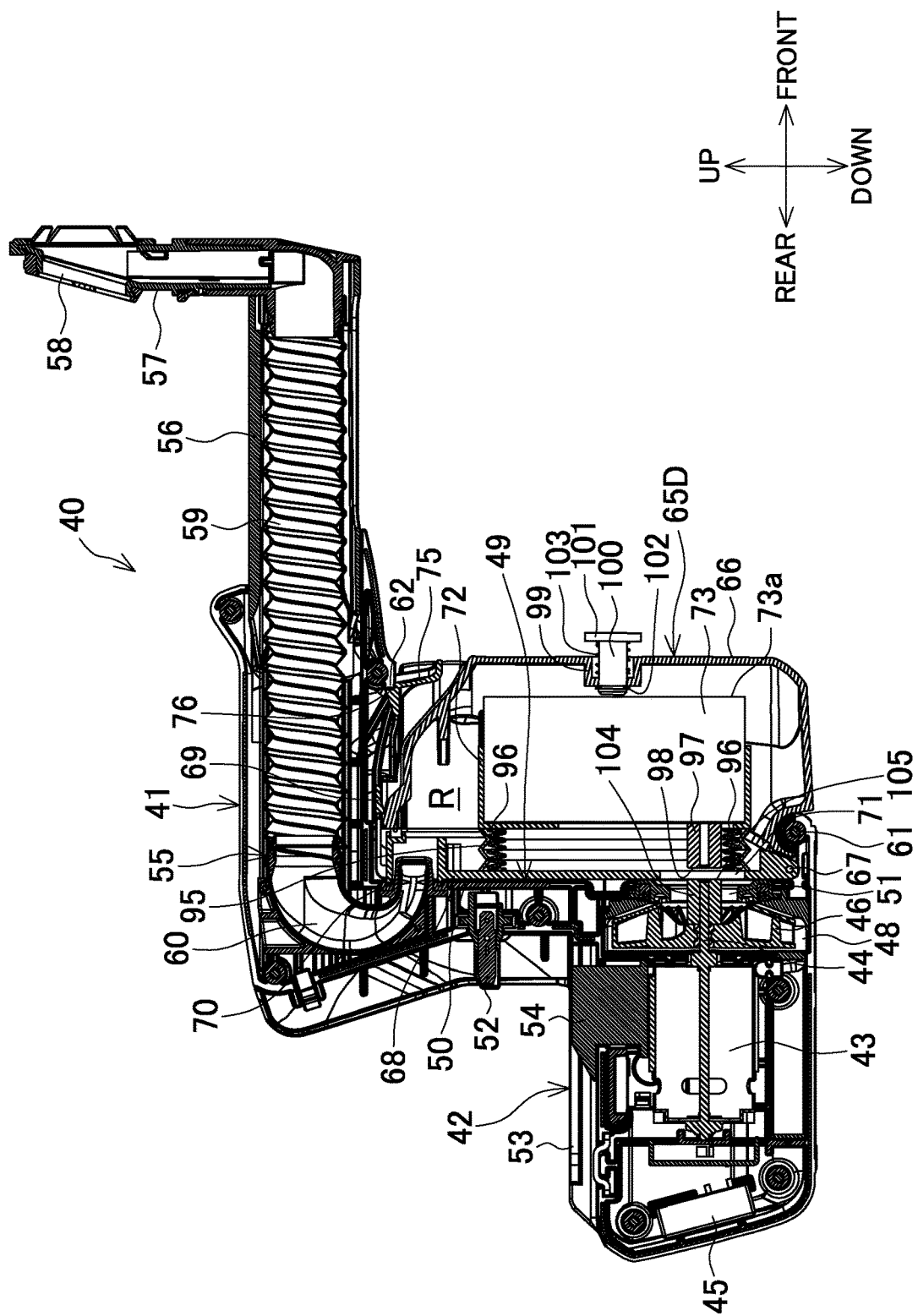
FIG. 14 is a center vertical cross-sectional view of the dust collector for electric power tool in the embodiment 5.

In a dust box 65D illustrated in FIGS. 13 and 14, the filter housing portion 72 is disposed to be separated forward from the lid body 68, and elastically supported swingable in all the directions of up-down, right-left, oblique, and front-rear in the box main body 66 via an elastic rubber 95. The elastic rubber 95 has a bellow tubular shape and has respective end portions coupled to the rear surface of the filter housing portion 72 and the front surface of the lid body 68 at a region surrounding the outlet 71. However, four coil springs 96, 96, . . . are disposed at respective four corners of the rear surface of the filter housing portion 72 between the filter housing portion 72 and the lid body 68 in the elastic rubber 95. Therefore, the filter housing portion 72 is biased forward, in which the elastic rubber 95 expands, by the coil springs 96, 96, . . . . To a portion opposing the outlet 71 of the lid body 68 on the rear surface of the filter housing portion 72, a front cam 97 is secured. The front cam 97 projects to the outlet 71 side and has a rear surface on which a front cam surface 98 having radial unevenness is formed.

At a portion opposing the center in the up-down and the right-left directions of the filter 73 on the front surface of the box main body 66, a circular depressed portion 99 projecting inward is disposed. A button shaft 100 that orthogonally penetrates the bottom surface of the circular depressed portion 99 and has a tip projecting inside the box main body 66 is disposed movable back and forth. The button shaft 100 has a front end at which a flange portion 101 having a diameter larger than an inner diameter of the circular depressed portion 99 is formed. The button shaft 100 has a rear end at which a clip 102 is disposed to retain the button shaft 100 on the rear side of the circular depressed portion 99. A coil spring 103 is externally mounted to the button shaft 100 between the flange portion 101 and the bottom surface of the circular depressed portion 99, and the button shaft 100 is biased by the coil spring 103 to a projecting position where the clip 102 abuts on the rear surface of the circular depressed portion 99. The central portions of the mountain folded portions 73a, 73a, . . . of the filter 73 in the filter housing portion 72 biased forward abut on the rear end of the button shaft 100 at the projecting position.

Then, the front end of the output shaft 44 of the dust collection motor 43 passes through the communication hole 51 and projects forward, and a rear cam 104 is integrally secured to the projecting portion. The rear cam 104 is opposed to the front cam 97 of the filter housing portion 72, and has a front surface on which a rear cam surface 105 having radial unevenness is formed.

In the dust collector 40 configured as described above, during the machining work (during the driving of the dust collection motor 43), when an operation to push the button shaft 100 of the dust box 65D rearward against the biasing by the coil spring 103 is performed, the filter housing portion 72 retreats against the biasing by the coil springs 96, 96, . . . via the filter 73 of which the mountain folded portions 73a, 73a, . . . abut on the button shaft 100. Then, the front cam surface 98 of the front cam 97, which has simultaneously retreated, is engaged with the rear cam surface 105 of the rear cam 104 that rotates with the output shaft 44, thereby transmitting the vibration to the front cam 97 and the filter housing portion 72 by the engagement of both cam surfaces 98, 105. By the vibration, the dust accumulated on the filter 73 can be removed. By releasing the pushing operation of the button shaft 100, the filter housing portion 72 is moved forward by the biasing by the coil springs 96, 96, . . . to separate the front cam 97 from the rear cam 104.

As described above, according to also the dust collector 40 and the hammer drill 1 of the embodiment 5, by disposing a dust removal means (rear cam 104 as a dust removal member, button shaft 100 as an operation member) configured to directly act to the filter 73 from outside the dust box 65D to remove the dust accumulated on the filter 73, the filter 73 can be directly vibrated by the rear cam 104, thus ensuring the effective dust removal at ease. Accordingly, clogging of the filter 73 can be easily avoided at low cost.

Especially, here, since the dust removal means has the configuration that includes the rear cam 104 operated by the driving of the dust collection motor 43 and the button shaft 100 configured to press the filter 73 to the rear cam 104 side from outside the dust box 65D, the effective vibration can be applied to the filter 73 using the dust collection motor 43.

Since the dust removal member is the rear cam 104 that is disposed between the dust collection motor 43 and the filter 73 and is rotated by the rotation of the output shaft 44 of the dust collection motor 43, the rotation of the output shaft 44 can be efficiently transmitted to the filter 73 as the vibration.

The shapes and the lengths of the front cam and the rear cam can be changed as necessary. However, the front cam is not required, and the vibration can be applied to the filter by directly bringing the rear cam in contact with the rear surface of the filter housing portion retreated by the press of the button shaft without the front cam. The number and the arrangement of the coil springs that bias the filter housing portion also can be changed as necessary, and the filter housing portion may be movable not in all the directions but in only the front-rear direction.

In addition, commonly to the embodiments, the configuration of the hammer drill can be changed as necessary in the direction and the type of the motor, the arrangement of the battery pack, and the like. An AC machine that includes a power supply cord may be employed instead of the battery pack. The power supply to the dust collector can be changed as necessary, for example, the relationship between the male terminal and the female terminal may be inverted, or terminal portions mutually abutting may be disposed at a joining part of the mounting portion and the fitting depressed portion instead of insertion of the terminal. Needless to say, not limited to the dust collector that includes the motor and the dust collection fan, the dust removal means of the invention is employable even in a configuration that includes only the filter and obtains a suctioning force from a fan disposed to the electric power tool.

Then, the electric power tool is not limited to the hammer drill, and the invention is applicable to other models, such as an electric drill, insofar as the dust collector is mountable.

The invention claimed is:

1. A dust collector for an electric power tool, comprising:
a casing mountable to the electric power tool;
a suction opening portion that (i) protrudes from the casing and (ii) is configured such that a tool bit of the electric power tool can pass through the suction opening portion;
a dust collecting route (i) in the casing and (ii) configured to route air from the suction opening portion into a dust box of the dust collector;
a filter (i) in the dust box and (ii) configured to capture dust suctioned with the air; and
a dust removal device (i) configured to directly act on the filter and (ii) accessible to a user from outside the dust box to remove the dust accumulated on the filter, wherein:
the dust removal device is close to or abuts the filter, and the dust removal device is a dust removal member operable from outside the dust box;
the filter is folded in a right-left direction, and the dust removal member is movable by operation from outside in a direction intersecting a mountain folded portion of the filter;
the dust removal member is inserted between a plurality of folds of the mountain folded portion; and
the dust box has right and left side surfaces having operation holes, rubbers are bonded in the operation holes, and the dust removal member is secured to a support shaft bridged between the rubbers.

2. A dust collector for an electric power tool, comprising:
a casing mountable to the electric power tool;
a suction opening portion that (i) protrudes from the casing and (ii) is configured such that a tool bit of the electric power tool can pass through the suction opening portion;
a dust collecting route (i) in the casing and (ii) configured to route air from the suction opening portion into a dust box of the dust collector;
a filter (i) in the dust box and (ii) configured to capture dust suctioned with the air;
a dust removal device (i) configured to directly act on the filter and (ii) accessible to a user from outside the dust box to remove the dust accumulated on the filter; and
a dust collection motor; wherein:
the filter is elastically supported; and
the dust removal device includes a dust removal member configured to be operated by driving of the dust collection motor and an operation member configured to press the filter to a side of the dust removal member from outside the dust box.

3. The dust collector for an electric power tool according to claim 2, wherein
the dust removal member (i) is between the dust collection motor and the filter and (ii) is a cam rotated by rotation of an output shaft of the dust collection motor.

4. A combination comprising:
an electrical power tool; and
a dust collector according to claim 2 mounted to the electric power tool.

5. A dust collector for an electric power tool, comprising:
a casing mountable to the electric power tool;
a motor in the casing;
a suction opening portion that (i) protrudes from the casing and (ii) is configured such that a tool bit of the electric power tool can pass through the suction opening portion;
a dust collecting route (i) in the casing and (ii) configured to route air from the suction opening portion into a dust box of the dust collector;
a filter (i) in the dust box and (ii) configured to capture dust suctioned with the air; and
a dust removal device including a cam and an operation member; wherein:
the cam is (i) operatively between the motor and the filter and (ii) configured to be rotated by rotation of an output shaft of the motor, and
the operation member is configured to selectively move the filter to be in contact with the cam to clear dust from the filter.

6. The dust collector for an electric power tool according to claim 5, wherein the operation member (i) extends through a wall of the dust box and (ii) has a portion outside of the dust box configured to be operated by a user.

7. The dust collector for an electric power tool according to claim 6, wherein:
the operation member includes a shaft extending through the wall of the dust box;
a first end of the shaft is the portion outside of the dust box; and
a second end of the shaft abuts the filter.

8. The dust collector for an electric power tool according to claim 7, wherein the operation member is configured to move axially along an axis of the shaft to selectively move the filter to be in contact with the cam.

9. The dust collector for an electric power tool according to claim 8, further comprising springs that elastically retain the filter spaced from the cam.

* * * * *